US012614806B2

(12) United States Patent (10) Patent No.: US 12,614,806 B2

Kneer et al. (45) Date of Patent: Apr. 28, 2026

(54) BATTERY PACK INCLUDING A CIRCUIT BOARD MOUNTED TO A HOUSING

(71) Applicant: Robert Bosch GmbH, Stuttgart (DE)

(72) Inventors: Florian Kneer, Duernau (DE); Christoph Klee, Stuttgart (DE); Florian Schmehl, Ostfildern (DE); Holger Wernerus, Pliezhausen (DE); Jan Breitenbach, Stuttgart (DE); Josef Baumgartner, Wildberg (DE); Marcin Rejman, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 846 days.

(21) Appl. No.: 17/845,722

(22) Filed: Jun. 21, 2022

(65) Prior Publication Data

US 2023/0006301 A1 Jan. 5, 2023

(30) Foreign Application Priority Data

Jun. 30, 2021 (DE) ..................... 10 2021 206 790.5

(51) Int. Cl.
H01M 50/284 (2021.01)
H01M 50/244 (2021.01)
(Continued)

(52) U.S. Cl.
CPC ....... H01M 50/284 (2021.01); H01M 50/244 (2021.01); H01M 50/247 (2021.01); H01M 50/519 (2021.01)

(58) Field of Classification Search
CPC ............. H01M 50/284; H01M 50/247; H01M 50/519; H01M 50/244
See application file for complete search history.

(56) References Cited

U.S. PATENT DOCUMENTS

2006/0057460 A1* 3/2006 Matthias ............... H01M 50/24
429/175
2009/0246615 A1 10/2009 Park
(Continued)

FOREIGN PATENT DOCUMENTS

DE 10 2012 219 784 A1 4/2014
DE 10 2014 217 991 A1 3/2016
(Continued)

OTHER PUBLICATIONS

EPO machine generated English translation of JP-2014041697-A (Year: 2014).*
(Continued)

*Primary Examiner* — Kimberly Wyluda
(74) *Attorney, Agent, or Firm* — Maginot, Moore & Beck LLP

(57) ABSTRACT

A battery pack is disclosed that includes a housing, including a cell holder, including at least one battery cell, the battery cell being at least partially received in the cell holder, including a cell connector, the cell connector being designed for electrical connection of the battery cell, and including a printed circuit board, the cell connector being electrically connected to the printed circuit board. The battery pack also has a mounting element to support the connection of the cell connector to the printed circuit board, the mounting element being located in a cut-out of the printed circuit board.

16 Claims, 21 Drawing Sheets

(51) Int. Cl.
_H01M 50/247_ (2021.01)
_H01M 50/519_ (2021.01)

(56) References Cited

U.S. PATENT DOCUMENTS

| | | | | |
|---|---|---|---|---|
| 2018/0138483 | A1* | 5/2018 | Sekine ................. | H01M 10/48 |
| 2020/0083570 | A1* | 3/2020 | Koestner ................. | H05K 1/18 |

FOREIGN PATENT DOCUMENTS

| | | | | |
|---|---|---|---|---|
| DE | 10 2018 104 342 | B3 | 7/2019 | |
| EP | 3 767 732 | A1 | 1/2021 | |
| FR | 3 047 616 | | 8/2017 | |
| JP | 2014041697 | A * | 3/2014 | .......... H01M 2/1055 |
| JP | 2021072167 | A * | 5/2021 | |
| WO | WO 2013-077205 | A * | 5/2013 | |

OTHER PUBLICATIONS

EPO machine generated English translation of JP-2021072167-A (Year: 2021).*
EPO machine generated English translation of WO 2013-077205 A (Year: 2013).*

* cited by examiner

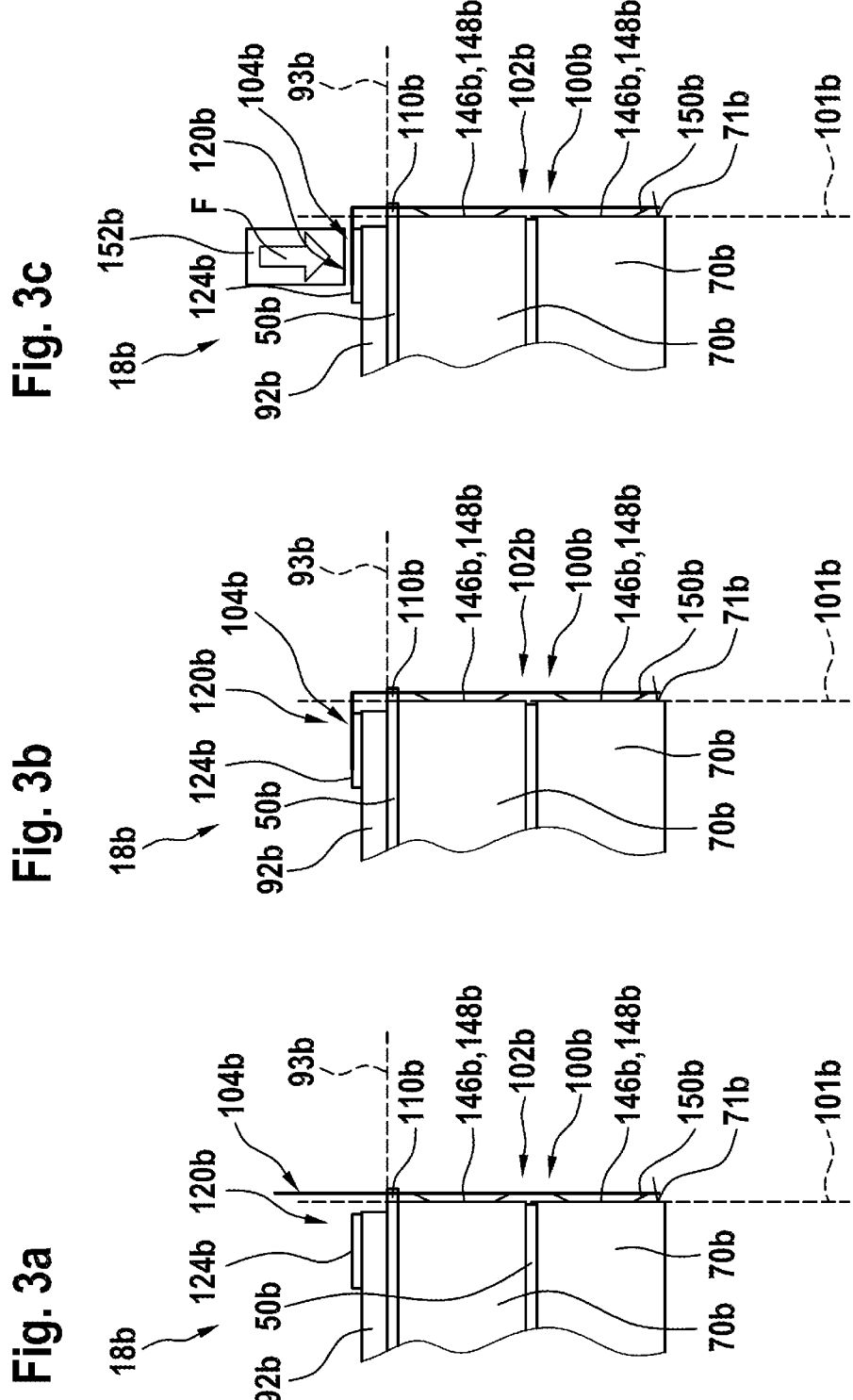

BATTERY PACK INCLUDING A CIRCUIT BOARD MOUNTED TO A HOUSING

This application claims priority under 35 U.S.C. § 119 to patent application no. DE 10 2021 206 790.5, filed on Jun. 30, 2021 in Germany, the disclosure of which is incorporated herein by reference in its entirety.

BACKGROUND

A battery pack for a hand-held power tool, comprising a cell connector, is described in DE 10 2014 217 991 A1.

SUMMARY

The disclosure relates to a battery pack comprising a housing, comprising a cell holder, comprising at least one battery cell, the battery cell being at least partially received in the cell holder, comprising a cell connector, the cell connector being designed for electrical connection of the battery cell, and comprising a printed circuit board, the cell connector being electrically connected to the printed circuit board. It is proposed that the battery pack have a mounting element to support the connection of the cell connector to the printed circuit board, the mounting element being located in a cut-out of the printed circuit board. Advantageously, a very good interfacing of the cell connector to the printed circuit board can thereby be realized.

The battery pack is in particular part of a system composed of the battery pack and a load, the load being supplied with power during operation via the battery pack. The battery pack maybe realized, for example, as a hand-held power-tool battery pack or as an electric-bicycle battery pack. The battery pack is in particular realized as an interchangeable battery pack that is designed to be detachable from the load without use of tools. The battery pack is in particular designed to be connectable to a charging device for charging the battery pack. Alternatively or additionally, the battery pack may also be realized in such a manner that it can be charged when connected to the load.

The load may be realized, in particular, as a garden appliance such as, for example, a lawn mower or hedge trimmer, as a household appliance such as, for example, an electric window cleaner or hand-held vacuum cleaner, as a hand-held power tool such as, for example, an angle grinder, a screwdriver, a power drill, a hammer drill, etc., or as an electric means of transport such as, for example, and electric bicycle in the form of a pedelec or e-bike, or as a measuring tool such as, for example, a laser distance measuring device. Furthermore, it is also conceivable for the load to be realized as another device, in particular a portable device such as, for example, a construction site light, a suction extraction device or a construction site radio.

The housing of the battery pack is preferably realized as an outer housing. The battery pack, in particular the housing of the battery pack, can be detachably connected to the load and/or a charging device via a mechanical interface. The housing of the battery pack may have one or more housing parts. The housing has at least one housing part that is realized as an outer housing part. The outer housing part in this case delimits the battery pack outwardly and can be touched by a user. In addition, the housing may have at least one inner housing part that is fully enclosed by the at least one housing part. Preferably, the cell holder is realized as one of the housing parts, in which case the cell holder maybe realized as an outer housing part or as an inner housing part.

The housing parts are connected to each other in a force-fitting, form-fitting and/or materially bonded manner.

The battery pack can be connected to the load in a force-fitting and/or form-fitting manner via a mechanical interface. Advantageously, the mechanical interface comprises at least one actuating element via which the connection of the battery pack to the load and/or to the charging device can be released. The actuating element maybe realized, for example, as a button, a lever or a key. In addition, the battery pack has at least one electrical interface via which the battery pack can be electrically connected to the load and/or to the charging device. The battery pack can be charged and/or discharged, for example, via the electrical connection. Alternatively or additionally, it is also conceivable that information can be transmitted from the battery pack to the load and vice versa via the electrical interface. The electrical interface is preferably realized as a contact interface in which the electrical connection is made via a physical contact between at least two conductive components. The electrical interface preferably comprises at least two electrical contact elements.

In particular, one of the electrical contact elements is realized as a plus contact and the other electrical contact element is realized as a minus contact. In addition, the electrical interface may have at least one additional contact that is designed to transmit additional information to the load and/or to the charging device. The additional contacts may be realized as signal contacts, coding contacts, temperature contacts, etc. The electrical contact elements may be realized, for example, as resilient contact elements in the form of contact tulips, or as flat contacts in the form of contact blades. Alternatively or additionally, the electrical interface may have a secondary charging coil element for inductive charging. Furthermore, the at least one battery cell that can be electrically connected to the load via the electrical contact device is located in the housing of the battery pack.

Furthermore, the battery pack preferably comprises a set of electronics. The set of electronics may comprise, for example, a computing unit, a control unit, a transistor, a capacitor, and/or the memory unit. Additionally or alternatively, it is also conceivable for information to be ascertained by the set of electronics. The set of electronics is designed to control the battery pack and/or the load by open-loop or closed-loop control. The set of electronics comprises, in particular, a BMS (battery management system) designed to monitor the battery pack. The BMS is in particular realized to prevent overcharging and/or exhaustive discharging of the battery pack.

Preferably, the BMS is realized for correct cell symmetrization, or cell balancing. The set of electronics may additionally comprise one or more sensor elements, for example a temperature sensor for ascertaining the temperature within the battery pack, or a motion sensor for ascertaining movements. The set of electronics may alternatively or additionally comprise a coding element such as, for example, a coding resistor. The electrical contact elements of the electrical interface of the battery pack may be located on or connected to the printed circuit board of the set of electronics. The printed circuit board may be realized as a rigid printed circuit board or a flexible printed circuit board. The printed circuit board may have an organic or an inorganic substrate.

The cell holder is preferably made of a plastic, in particular a thermoplastic. The cell holder is preferably made of a temperature-resistant plastic, preferably a fiber-reinforced plastic. The cell holder is preferably realized as a single part or as a single piece. In the context of this application, as a single piece is to be understood to mean in particular a component that is realized from one piece and is not realized from a plurality of components that are connected to one another in a materially bonded and/or in a force-fitting and/or form-fitting manner. Accordingly, a single-piece component is composed of a single material. In the context of this application, as a single part is to be understood to mean in particular a plurality of components that are connected to one another via a material bond, for example by means of a two-component injection molding process. A single-part component may thus be composed of one material or of a plurality of materials. Alternatively, it is also conceivable for the cell holder to be of a multipart design, in which case the different parts are connected to one another in a force-fitting and/or form-fitting manner.

The cell holder has at least one battery cell receiver in which a single battery cell can be received. Alternatively, it is also conceivable for the battery cell receivers to be realized in such a manner that two or more battery cells can be received in them. The battery cell receiver is in particular realized in such a manner that, when connected to the battery cell, a large part of the outer surface, in particular a large part of the peripheral surface of the battery cell, is enclosed by the battery cell receiver. In particular, at least 60%, preferably at least 75%, preferably at least 90%, of the peripheral surface of the battery cell is enclosed against the battery cell receiver. Preferably, the battery cell receiver is realized in such a manner that the at least one battery cell bears against an inner surface of the battery cell and is fixed in place by the battery cell receiver. The cell holder has a wall between two battery cell receivers which spatially and electrically isolates the battery cell receivers from each other.

The battery cell may be realized as a galvanic cell, having a structure in which one cell terminal is located at one end and another cell terminal is located at an opposite end. In particular, the battery cell has a positive cell terminal at one end and a negative cell terminal at an opposite end. Preferably, the battery cells are realized as NiCd or NiMh, and particularly preferably lithium-based battery cells, or Li-Ion battery cells. Alternatively, it is also conceivable, exemplarily, for the battery cell to be realized as a pouch cell. The battery voltage of the battery pack is usually a multiple of the voltage of a single battery cell and results from the connection (parallel or serial) of the battery cells. In the case of common battery cells having a voltage of 3.6 V, this results in exemplary battery voltages of 3.6 V, 7.2 V, 10.8 V, 14.4 V, 18 V, 36 V, 54 V, 108 V, etc. Preferably, the battery cell is realized as an at least substantially cylindrical round cell, with the cell terminals located at the ends of the cylinder shape.

The cell connectors are designed to electrically connect the at least one battery cell to the printed circuit board The cell connectors can be of a single-piece, single-part or multipart design. The cell connectors can be connected in a force-fitting and/or form-fitting manner to the housing of the battery pack, in particular to the cell holder. It is also conceivable for the cell connector to be partially or fully encapsulated by the housing, in particular the cell holder. The cell connector is made of a metallic material. For example, the cell connector may be made of a pure copper (copper content >95%), a copper alloy or a nickel compound. The battery cells are each connected at their cell terminals to a cell connector.

The cell connector has a cell connecting element for electrical connection of the battery cells, and a printed-circuit-board connecting element for electrical connection to the printed circuit board. The cell connecting element in this case bears directly and immediately against the battery cell, in particular a cell terminal of the battery cell, and is preferably connected to the cell terminal in a materially bonded manner. The material bond may be effected by a soldering process or by a welding process, in particular by a resistance welding process or by a laser welding process. In this context, the welded joint differs from the soldered joint, in particular, in that, in the case of the welded joint, there is partial melting of the components to be connected. The material bond may be effected with the aid of a material bonding medium. In the case of a soldering process, the material bonding medium is realized as a solder. In the case of a welding process, the material bonding medium may be realized, for example, as a metal plate that locally increases the resistance. The printed-circuit-board connecting element may be connected directly to the printed circuit board, in particular to a conducting track of the printed circuit board, or indirectly to the printed circuit board via an electrical contact element.

The printed circuit board is preferably realized as a flat and rigid printed circuit board. The printed circuit board has an upper side and an underside, the underside facing toward the battery cells. The cut-out is realized in such a manner that a passage is formed between the upper side and the underside by means of the cut-out. The cut-out may be located at the edge of the printed circuit board or inside the printed circuit board. The cut-out may thus have a closed or an open edge.

The mounting element is preferably realized as a single piece or single part with the housing or the cell holder. However, the mounting element may also be connected to these and made of a different material, for example a metal. Supporting of the connection of the cell connector to the printed circuit board is effected during the assembly process or once connected.

It is furthermore proposed that the battery pack have at least two battery cells, the cell connector being designed for electrical connection of the at least two battery cells. Advantageously, battery cells can thus be connected in series or parallel by means of the cell connector.

It is furthermore proposed that the printed-circuit-board connecting element be designed to monitor a single cell voltage. In particular, the printed-circuit-board connecting element is electrically connected to the set of electronics of the battery pack. Advantageously, the single cell voltage can thus be provided to the BMS for the purpose of monitoring.

It is additionally proposed that the printed-circuit-board connecting element be located in the cut-out of the printed-circuit board, between the printed-circuit board and the mounting element. Advantageously, a particularly good electrical connection can thus be realized.

It is furthermore proposed that the printed circuit board span a printed-circuit-board plane that extends substantially perpendicularly to a cell-connector plane spanned by the cell connecting element. Advantageously, a compact battery pack can be provided by this arrangement. The printed-circuit-board connecting element extends partially or fully along the cell-connector plane. It is also conceivable, however, for the printed-circuit-board connecting element to extend partially along the printed-circuit-board plane.

It is furthermore proposed that the cut-out of the printed circuit board have an edge metallization, the printed-circuit-board connecting element bearing against the edge metallization. The edge metallization is assigned to a connection point at which the electrical connection of the cell connector, in particular of the printed-circuit-board connecting element of the cell connector, to the printed circuit board is effected. The edge metallization can be realized, for example, as a copper coating or a tin plating of the printed circuit board.

It is additionally proposed that the mounting element be of a substantially rigid design. Rigid in this context is to be understood to mean that the mounting element does not apply any force to the cell connector when in the assembled state.

It is furthermore proposed that the cell connector, in particular the printed-circuit-board connecting element of the cell connector, be connected to the printed-circuit board in a materially bonded manner, preferably by means of a soldered joint. Advantageously, a good mechanical and electrical connection can thus be realized. Alternatively, it is also conceivable for the connection to be effected by a welding process.

It is furthermore proposed that the mounting element be realized as a spring element that applied a force to the cell connector in the direction of the printed circuit board. Advantageously, an optimal mechanical and electrical connection can thus be realized. The spring element can be realized, for example, as a plastic spring. The spring element is in particular realized in such a manner that a force is applied to the cell connector in two directions, preferably in at least two opposite directions.

It is additionally proposed that the mounting element be realized as a single piece with the cell holder.

The disclosure additionally relates to production method for a battery pack comprising a housing, comprising a cell holder, comprising at least one battery cell, the battery cell being at least partially received in the cell holder, comprising a cell connector, the cell connector being designed for electrical connection of the battery cell, and comprising a printed circuit board, the printed circuit board having a cut-out, and comprising a mounting element for supporting the connection of the cell connector to the printed circuit board. It is proposed that the connection between the cell connector and the printed circuit board be effected by pressing on the printed circuit board, by which the cell connector with the mounting element is received in the cut-out and deformed. It is thereby possible, advantageously, to provide a battery-pack assembly method that is inexpensive and reliable in terms of process.

It is furthermore proposed that the cut-out of the printed circuit board have an edge metallization, a force being applied to the cell connector by the mounting element in the direction of the edge metallization.

The disclosure also relates in particular to a battery pack comprising a housing, comprising at least two battery cells, the battery cells being received in the housing, comprising a cell connector, the cell connector being designed for electrical connection of the battery cells, and comprising a printed circuit board, the cell connector being electrically connected to the printed circuit board. It is proposed that the battery pack have a connection point for connecting the cell connector to the printed circuit board in a materially bonded manner, the connection point being located on a side of the printed circuit board that faces away from the battery cells. Advantageously, a good interfacing of the cell connector to the printed circuit board can thereby be realized.

The connection point may be provided for a welding process and/or for a soldering process. The connection interface is preferably connected to a conducting track of the printed circuit board. The connection interface may have a material bonding medium such as, for example, a solder pad. Alternatively, it is also conceivable for the connection point to have a plug-in connection that is provided for connecting a plug or a cable. Furthermore, it is conceivable for the connection point to be realized as a welding point.

It is additionally proposed that the printed-circuit-board connecting element of the cell connector have a bending aid for assisting a bending operation during an assembly operation. The bending aid may be realized, for example, as an indentation, a constriction or a narrowing in the material of the printed-circuit-board connecting element. Alternatively, it is also conceivable for the bending aid to be provided by selection of the material and thickness of the printed-circuit-board connecting element. For this purpose the printed-circuit-board connecting element may be made, exemplarily, of a pure copper or a copper alloy with a thickness of less than 0.5 mm, preferably less than 0.3 mm, more preferably less than 0.15 mm. This softens the cell connector in such a manner that it can be shaped or bent for assembly with minimal force.

It is furthermore proposed that the battery pack have at least one cell-connector guide element that is designed to guide the cell connector during the assembly process. Advantageously, reliable assembling can thus be realized. The cell-connector guide element may be realized as a single piece or single part with the housing or the cell holder of the battery pack. The cell connector guide element is designed in particular to guide the cell connector in the direction of the connection point during bending. The cell-connector guide element may be realized, for example, as a guide rail or a guide groove.

The disclosure additionally relates in particular to an assembly method for a battery pack comprising at least two battery cells, comprising a cell connector, the cell connector being designed for electrical connection of the battery cells, and comprising a printed circuit board, the cell connector being electrically connected to the printed circuit board. It is proposed that the cell connector be connected to the printed circuit board in a materially bonded manner by means of a hot-stamp process. It is thereby possible, advantageously, to realize an interfacing of the cell connector to the printed circuit board that is reliable in terms of process. In the hot-stamp process, the cell connector, in particular a printed-circuit-board connecting element of the cell connector, is positioned on the connection point and is subjected to a force by a temperature-controlled stamp, which triggers the soldering process. The hot-stamp process in this case is preferably effected automatically or semi-automatically by means of a hot-stamp device.

It is furthermore proposed that the cell connector be connected to the battery pack in a force-fitting and/or form-fitting manner via the cell-connector guide element before the hot-stamp process. Advantageously, this further improves the assembly process.

It is additionally proposed that the cell connector be bent before the hot-stamp process. The bending in this case is effected in particular in a range of between 60° and 120°, preferably in a range of between 80° and 100°, more preferably by substantially 90°. The angle in this case corresponds substantially to the orientation of the printed circuit board and of the cell connector before bending.

The disclosure also relates in particular to a battery pack comprising a housing, comprising at least two battery cells, the battery cells being received in the housing, comprising a cell connector, the cell connector being designed for electrical connection of the battery cells, and comprising a printed circuit board, the cell connector having a cell connecting element for electrical connection of the battery cells, and a printed-circuit-board connecting element for electrical connection to the printed circuit board, the cell connecting element being connected to the battery cells by a first material bond and to the printed-circuit-board connecting element by a second material bond. It is proposed that the first material bond and the second material bond be produced by use of a first connection technique. Advantageously, this can reduce the complexity of the production process and increase the speed. In addition, an automated process is thereby made possible.

It is furthermore proposed that the first connection technique be realized as a welding process. The welding process may be performed by means of the same welding device. The welding process may be realized, for example, as a laser welding process or as a resistance welding process. The first connection technique in this case is non-dependent on the material combination of the components to be connected. In particular, the first and the second material bond each have at least two welding points. Advantageously, this can reduce the likelihood of a faulty material bond.

It is furthermore proposed that the printed-circuit-board connecting element be connected to the printed circuit board by a third material bond, the third material bond being effected by use of a second connection technique, which differs from the first connection technique. In particular, the second connection technique is realized as a soldering process.

It is additionally proposed that the cell connecting element be connected on one side to the printed-circuit-board connecting element and to the battery cells by the first and the second material bond.

It is furthermore proposed that the housing, in particular a cell holder of the housing, have a positioning element and/or a locking element, designed to be connected in a force-fitting and/or form-fitting manner to the printed-circuit-board connecting element. Advantageously, assembling can thus be facilitated.

The disclosure also relates in particular to an assembly method for a battery pack, a first assembly module, having a printed circuit board with at least one printed-circuit-board connecting element, being connected in a first method step to a second assembly module, having a cell holder in which at least two battery cells are located, a cell connecting element being connected in a second method step to the battery cells via a first material bond and to the printed-circuit-board connecting element via a second material bond, the first and the second material bond being effected by the same connection device. The assembly module has different components that are fixedly or movably connected to each other. The connection device may be realized as a welding device or a soldering device. The connection device is preferably of an automatic or semi-automatic design.

It is furthermore proposed that the connection device and the battery pack be only moved translationally relative to each other between the first material bond and the second material bond. There is no rotational movement of the connection device relative to the battery pack. The translatory movement may be effected in this case by the connection device and/or a holding device for holding the battery pack, or the assembly modules.

The disclosure alternatively relates in particular to a battery pack comprising a housing, comprising at least two battery cells, the battery cells being received in the housing, comprising a cell connector, the cell connector being designed for electrical connection of the battery cells, and comprising a printed circuit board, the cell connector being electrically connected to the printed circuit board. It is proposed that the cell connector have a strain relief element and/or a locking element. Advantageously, a robust battery pack can thus be provided.

The strain relief element is designed in particular for relieving a tensile stress between the printed circuit board and the battery cell. The strain relief element may act in a horizontal and/or vertical direction. In this context, horizontal is to be understood as a direction along or parallel to a longitudinal axis of the battery cells. Vertical in this context is to be understood as a direction perpendicular to the longitudinal axis of the battery cells.

It is furthermore proposed that the strain relief element be located between the printed-circuit-board connecting element and the cell connecting element. The strain relief element is preferably realized as a single piece or single part with the cell connector.

It is furthermore proposed that the strain relief element be realized in the form of a step. The step in the case has a cavity that extends in the horizontal or vertical direction and that has a length in a range of between 0.5 mm and 2.0 mm. In particular, the length of the cavity corresponds at least to 1/100, preferably at least 1/50, of a length of the battery cell. The cavity may exemplarily have two mutually opposite walls that extend in the horizontal or vertical direction and are connected via a third wall that extends perpendicularly.

It is additionally proposed that the strain relief element be realized so as to be elastically deformable, such that a non-destructive relative movement of the battery cells with respect to the printed circuit board, in particular in the vertical direction, is made possible. The strain relief element is designed in particular to protect the material bonds of the cell connector to the battery cells and the printed circuit board, such that a relative movement, for example caused by the battery pack falling to the ground, is partially or completely taken up by a deformation of the cell connector in the region of the strain relief element.

It is furthermore proposed that the cell connector have a positioning element that is designed to be connected in a form-fitting manner to the housing or to a cell holder of the battery pack, the positioning element being realized in such a manner that the cell connector can be released by a purely translatory movement. The positioning element may be realized as a single piece or single part with the housing or the cell holder of the battery pack. The positioning element maybe realized, for example, as a peg or a step that substantially fully limits a lateral movement of the cell connector when in the connected state. Some play is provided in this case to simplify assembly.

It is furthermore proposed that the cell connector has a return means that applies a force to the housing or the cell holder. The return means maybe realized as a single piece with the cell connector. The cell connector has a recess or protuberance corresponding to the positioning element, the restoring means being located in the recess or on the protuberance. The restoring means may be realized, for example, as a spring arm.

It is additionally proposed that the locking element be designed to be connected in a form-fitting manner to the housing or to the cell holder, the locking element being realized in such a manner that release of the locking is only possible by a rotational movement or an elastic deformation of the cell connector. The locking element is preferably realized as a single piece with the cell connector.

It is furthermore proposed that the cell connecting element and the printed-circuit-board connecting element of the cell connector can be connected to each other in a materially bonded manner, the cell connecting element and the locking element being realized as a single piece with each other. In particular, the printed-circuit-board connecting element is connected to the cell holder or the housing via a positioning element and is additionally locked via the cell connecting element. Advantageously, the printed-circuit-board connecting element is thereby fixed in place before the material bond is produced.

It is furthermore proposed that the printed-circuit-board connecting element have a fuse, which in particular is realized as a constriction. The fuse is realized as a single piece with the printed-circuit-board connecting element.

The disclosure alternatively relates in particular to a battery pack comprising a housing, comprising at least two battery cells, the battery cells being received in the housing, comprising a cell connector, the cell connector being designed for electrical connection of the battery cells, and comprising a printed circuit board, the cell connector being electrically connected to the printed circuit board. It is proposed that the battery pack have a connection point for connecting the cell connector to the printed circuit board in a materially bonded manner, the connection point being located on a side of the printed circuit board that faces toward the battery cells. Advantageously, the connection interface can thereby be located in a protected region.

In particular, the connection point is located on a side that is not directly accessible. The connection point is located, in particular, between the printed circuit board and the cell holder. The cell holder is preferably realized in such a temperature resistant manner that the producing of a material bond between the connection point and the cell connector does not melt, or only partially melts, the cell holder. Alternatively or additionally, there may be a thermal protection element located between the printed circuit board and the cell holder. The thermal protection element has a higher melting point than the cell holder and is designed to protect the cell holder. The thermal protection element may be realized, for example, as a Kapton tape or as a mica foil that is glued onto the cell holder.

It is furthermore proposed that the printed circuit board have a first cut-out and a second cut-out located adjacently to each other, the connection point being located between the first and the second cut-out. The connection points are in particular substantially perpendicular to the first and the second cut-out. The first and the second cut-out are preferably located close to one another, in such a manner that the connection point substantially completely fills the area between the cut-outs.

It is furthermore proposed that the first cut-out be provided for introducing thermal energy. Advantageously, the material bond can thus be supported and/or effected by means of the first cut-out. Thermal energy may be introduced without contact, in particular by irradiation with a heat source, in particular a laser, or by contact, in particular by a soldering device or a welding device. The soldering device may be realized, for example, as a soldering iron or a hot-stamp.

It is additionally proposed that the second cut-out be provided for introducing a material bonding medium. The material bonding medium may be realized, for example, as a solder wire. Advantageously, the material bond can be effected or supported by the second cut-out. Alternatively or additionally, it is also conceivable for the material bonding medium to be located on the connection point and/or adjoining the connection point. Alternatively, the printed circuit board may also have only one cut-out, provided for introducing thermal energy and/or for introducing a material bonding medium.

It is furthermore proposed that the first cut-out be larger than the second cut-out. In particular, the first cut-out and/or the second cut-out have/has an edge metallization. Advantageously, an optimal electrical connection is thereby provided between the cell connector and the printed circuit board.

It is furthermore proposed that the connection point have a solder pad, in particular a copper pad. Advantageously, an optimal soldered joint can thus be realized.

It is additionally proposed that the printed circuit board have a checking unit that is designed to optically and/or electrically check the material bond between the cell connector and the printed circuit board. The checking unit is in particular designed to monitor or check the electrical connection between the printed circuit board and the cell connector. The checking unit has one or more checking elements, which preferably are connected to the printed circuit board and located thereon. The checking element may be realized, for example, as a cut-out, it being possible to ascertain by visual inspection following the material bond whether there is a meniscus present in the region of the checking element in the form of the cut-out, the meniscus indicating a successful material bond. Alternatively, it is also conceivable for the checking element to be realized in the form of an interruption of the connection point and/or of material bonding medium connected to the connection point. The interruption is realized in such a manner that it is closed by the material bond. Advantageously, the material bond may then be electrically checked by means of a short-circuit test.

It is furthermore proposed that the connection point have a material bonding medium that is realized as a spacer between the connection point and the cell connector. The cell connector and the connection point are spaced apart by means of the spacer in such a manner that an electrical connection is only effected by the material bond and the at least partial melting of the material bonding medium.

It is furthermore proposed that the checking unit have a test point located on a side of the printed circuit board that faces away from the connection point. Advantageously, the electrical connection can thus be checked on an easily accessible side of the printed circuit board.

It is additionally proposed that the cell connector have a heat dissipation limiting element, which is located outside the connection point. Advantageously, the production of the material bond is thereby optimized. The heat dissipation limiting element is realized, in particular, by a suitable geometry of the cell connector, for example a narrowing of material. The heat dissipation limiting element may be realized, for example, as a meander structure.

The disclosure alternatively relates in particular to a production method for a battery pack, a cell connector being connected to a printed circuit board via a material bond, the battery pack having a checking unit. It is proposed that the electrical connection between the printed circuit board and the cell connector be checked by means of the checking unit during the production of the material bond. Advantageously, this enables the quality of the electrical connection to be checked directly.

The disclosure alternatively relates in particular to a battery pack comprising at least two battery cells, comprising a cell connector for a laser welding process, the cell connector being designed for electrical connection of the battery cells, the cell connector having at least two connection surfaces that bear partially against a respective cell terminal of the battery cells. It is proposed that the connection surfaces be of a convex design. Advantageously, this ensures a more reliable material bond between the cell connector and the battery cells.

The connection surfaces may have one or more convex regions. The connection surfaces are preferably realized as closed surfaces in order to ensure optimal heat distribution during the laser welding process.

It is furthermore proposed that the connection surfaces are of such a convex design that a position of a contact region in which the connection surfaces bear against the cell terminal is dependent on an axial offset of the battery cells relative to each other. Advantageously, a good connection can thus always be realized. The connection surface in this case is in principle suitable for connection to the cell terminal, the contact region only being determined during the assembly process.

It is furthermore proposed that the connection surfaces be of such a convex design that, within a range of the axial offset of between 0 and 0.5 mm, a size of the contact region is substantially constant. Advantageously, a constant quality of the material bond can thus be ensured. A substantially constant size of the contact region is to be understood in this case as a deviation of preferably less than 10%. The contact region is realized as a partial surface of the connection surface, which is located entirely within the connection surface.

It is additionally proposed that a diameter of the connection surface be at least 30% of a diameter of the battery cell, a diameter of the contact region corresponding to at least 10% of the diameter of the battery cell. Advantageously, this can further improve the interfacing.

It is furthermore proposed that a radius of the connection surface is within a range of between 50 mm and 300 mm, in particular within a range of between 100 mm and 200 mm. Preferably, a diameter of the battery cells is within a range of between 18 and 23 mm. Advantageously, a good interfacing can thereby be realized.

It is furthermore proposed that the connection surface be enclosed by a cylindrical wall. The cylindrical wall is realized as a single piece with the connection surface. In particular, the cylindrical wall delimits the connection surface laterally.

It is additionally proposed that the cell connector have two connection surfaces connected to each another as a single piece via a bridge. Advantageously, the connection surfaces are mechanically coupled to each other via the bridge.

The disclosure alternatively relates in particular to a production method battery pack comprising at least two battery cells that are electrically connected to each other via a cell connector, the cell connector having, for each battery cell, one connection surface that bears partially against a cell terminal of the battery cells, the cell connector being connected to the battery cells in a materially bonded manner by means of a laser welding process. It is proposed that the connection surfaces be of a convex design. Advantageously, an optimal material bond can thus be ensured.

It is furthermore proposed that the laser welding be effected under the action of a contact pressure, by which a convex geometry of the connection surface is at least partially transferred to the cell terminals of the battery cells in the region of the connection surface. Advantageously, this can further improve the interfacing.

It is furthermore proposed that a support position of the cell connector be sensed by means of an optical system, and that the laser welding process be effected in dependence on the support position. Advantageously, this can further improve the interfacing. The optical system may comprise, for example, a camera or a laser scanner that is connected to a computing unit for the purpose of evaluation and control.

BRIEF DESCRIPTION OF THE DRAWINGS

Further advantages are disclosed by the following description of the drawings. The drawings, the description and the claims contain numerous features in combination. Persons skilled in the art will expediently also consider the features individually and combine them to form appropriate further combinations. References of features of different embodiments of the disclosure that substantially correspond are denoted by the same number and provided with a letter identifying the embodiment.

In the drawings:

FIG. 2b shows a schematic side view before mounting of a printed circuit board of the battery pack according to FIG. 2a;

FIG. 2c shows a schematic side view after the mounting of the printed circuit board of the battery pack according to FIG. 2a;

FIG. 3a shows a schematic side view before mounting of a printed circuit board of a further battery pack;

FIG. 3b shows a schematic side view during the mounting of the printed circuit board of the further battery pack according to FIG. 3a;

FIG. 3c shows a schematic side view after the mounting of the printed circuit board of the further battery pack according to FIG. 3a;

FIG. 3d shows a side view of a cell connector of the battery pack according to FIG. 3a;

FIG. 4b shows a perspective view of a first mounting module of the battery pack according to FIG. 4a;

FIG. 5b shows a first cross-section through the battery pack according to FIG. 5a;

FIG. 5c shows a second cross-section through the battery pack according to FIG. 5a;

FIG. 7a shows a schematic view during mounting of a printed circuit board of a further embodiment of a battery pack;

FIG. 7b shows a schematic illustration of a cell connector of the battery pack according to FIG. 7a;

FIG. 7c shows a top view of a printed circuit board of the battery pack according to FIG. 7a;

FIG. 7d shows a bottom view of the printed circuit board of the battery pack according to FIG. 7a;

FIG. 9*c* shows a schematic side view of the printed circuit board of the battery pack according to FIG. 9*a.

DETAILED DESCRIPTION

Figure 1A:
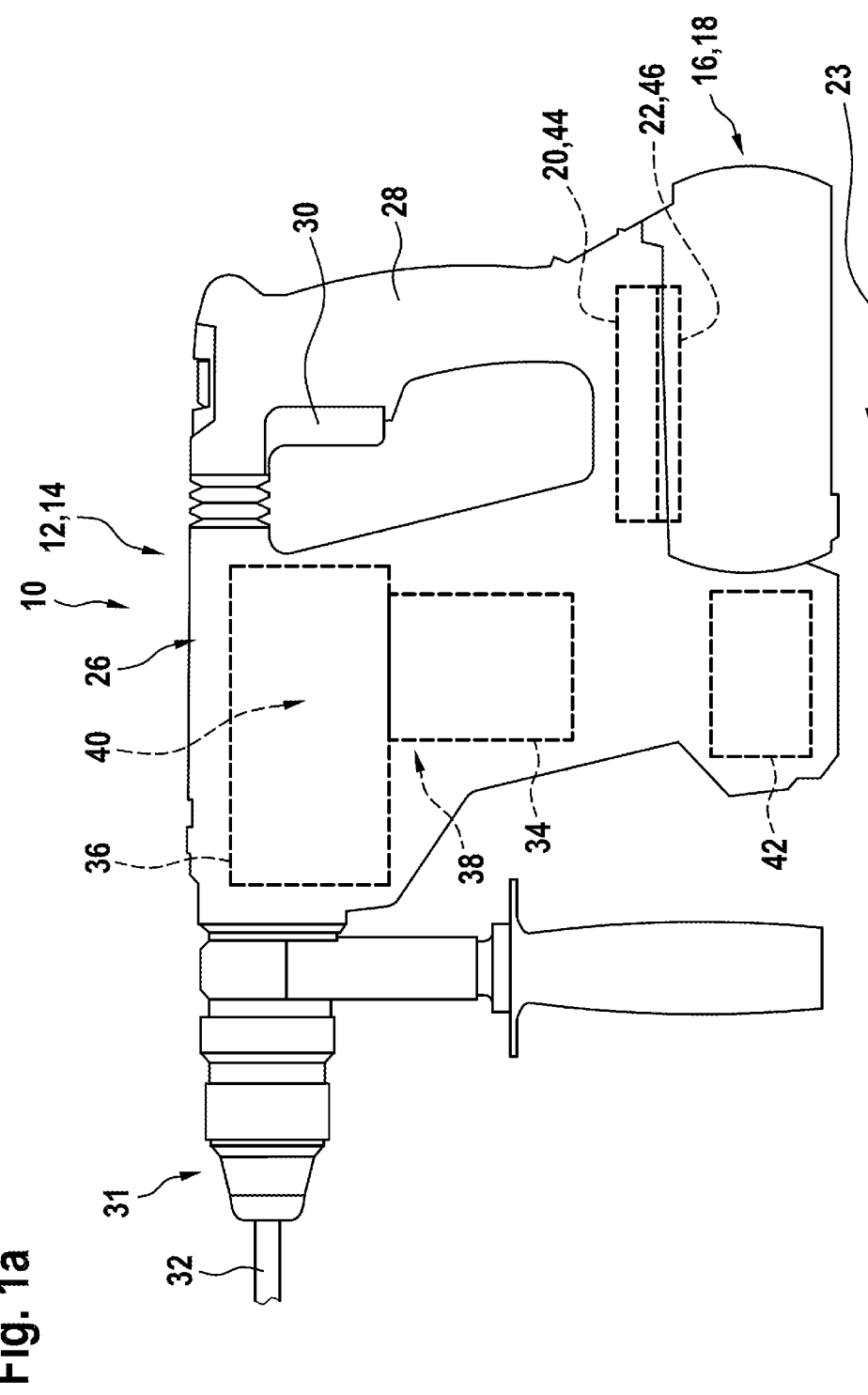
FIG. 1a shows a schematic side view of a hand-held power tool with a battery pack.

FIG. 1*a* shows a side view of a system 10 composed of a load 14 realized as a hand-held power tool 12 and of a battery pack 18 realized as a hand-held power-tool battery pack 16. The hand-held power tool 12 is thus realized as a battery-operated hand-held power tool and during operation is supplied with power via the battery pack 18. The hand-held power tool 12 and the battery pack 18 each have a mechanical interface 20, 22 via which the two components of the system 10 are detachably connected to each other. The battery pack 18 is thus realized as an interchangeable battery pack and can be replaced by an identical or similar battery pack. The hand-held power tool 12 is realized, for example, as a hammer drill.

The hand-held power tool 12 has a housing 26, located at the rear end of which there is a handle 28 comprising an operating switch 30 for switching the hand-held power tool 12 on and off. Located at the front end of the housing 26 of the hand-held power tool 12 there is a tool receiver 31, which is designed to receive an insert tool 32. Located between the handle 28 and the tool receiver 31 there is a drive unit 38 that comprises an electric motor 34 and a transmission 36. The transmission 36 comprises an impact mechanism unit 40 and is located above the electric motor 34. The impact mechanism unit 40 comprises a pneumatic impact mechanism. Located beneath the electric motor 34 is a set of electronics 42, via which the hand-held power tool 12 can be controlled by closed-loop or open-loop control. The battery pack 18 is located beneath the handle 28 and adjacent to the set of electronics 42.

The battery pack 18 and the load 14 each have a mutually corresponding electrical interface 44, 46, via which the battery pack 18 can be electrically connected to the load 14, in particular to the set of electronics 42 of the load 14. When connected to each other, the battery pack 18 provides the power supply for the load 14. In addition, information and signals may be exchanged via the electrical interface 46 of the battery pack 18.

Figure 1B:
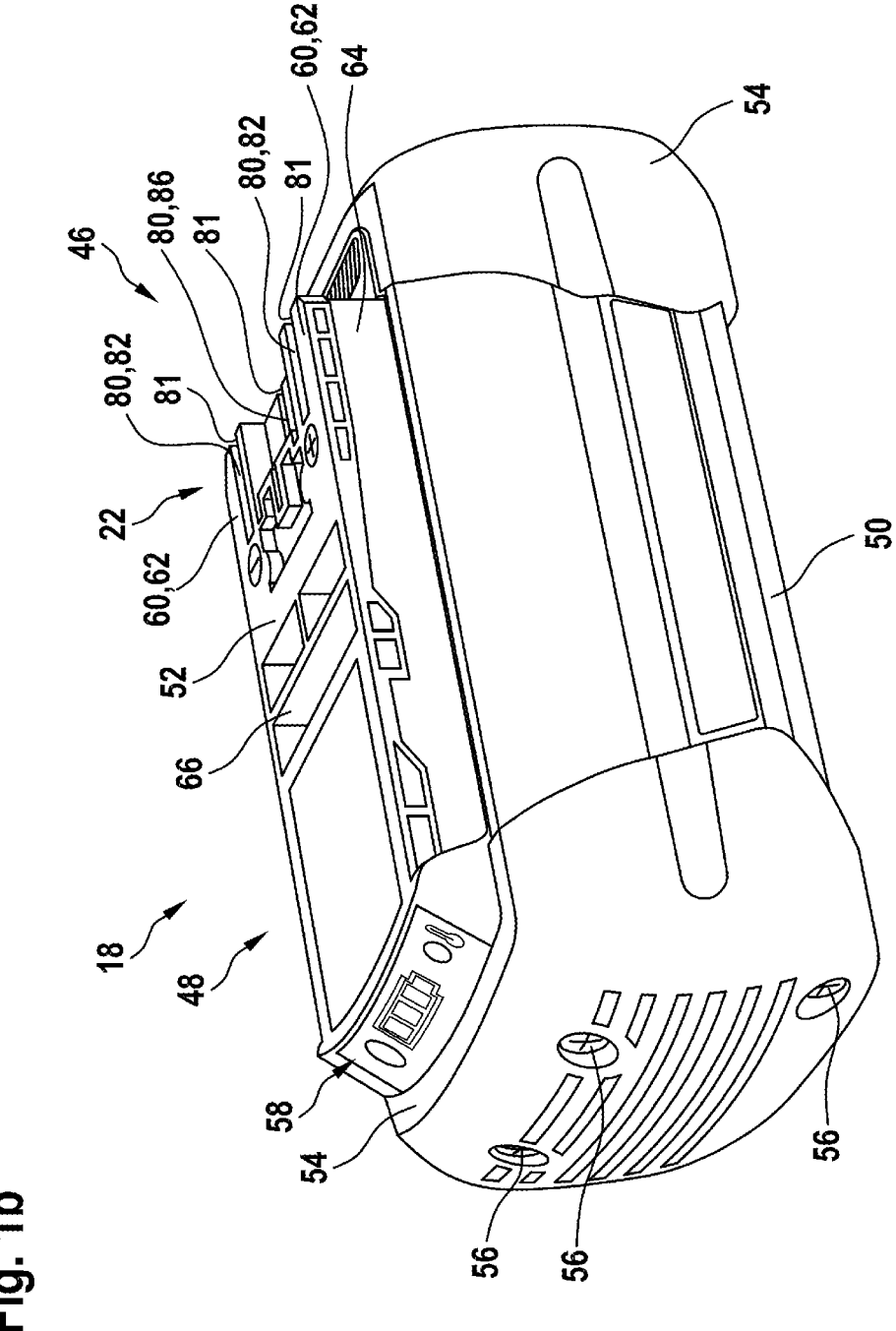
FIG. 1b shows a perspective view of a battery pack.

FIG. 1*b* shows a front view of the battery pack 18. The battery pack 18 is mechanically connected to the load 14 in a detachable manner via the mechanical interface 22. The battery pack 18 has a battery pack housing 48, which for example is of a multipart design. The housing 48 is composed of a housing material containing plastic. Preferably, the housing 48 is made of a polycarbonate or a high-density polyethylene (HD PE). The housing 48 is realized in particular as an outer housing. The housing 48 is of a multipart design, for example. The housing 48 exemplarily comprises a cell holder 50, an interface housing part 52 and two side housing parts 54. The housing parts 50 52, 54 are connected to each other via fastening elements 56, which exemplarily are realized as screws. The housing parts 50 52, 54 are all at least partially realized as outer housing parts. It is also conceivable, however, for the cell holder 50 to be located entirely in the housing 48, and thus not to be realized as an outer housing part.

Located on the front of the battery pack 18 there is a state-of-charge indicator 58, via which the state of charge of the battery pack 18 can be indicated. The housing 48 of the battery pack 18, in particular the interface housing part 52, comprises the mechanical interface 22. The battery pack 18 is exemplarily realized as a sliding battery pack. For the purpose of being connected to the hand-held power tool 12, the battery pack 18 is slid onto the hand-held power tool 12 along a battery connection direction 23 (see FIG. 1*a*).

The mechanical interface 22 has a pair of holding elements 60 on which the battery pack 18 is held when connected to the hand-held power tool 12. The holding elements 60 are exemplarily realized as guide rails 62. The holding elements 60 extend substantially parallel to the battery connection direction 23 of the battery pack 18. Adjacent to the guide rails 62, the battery pack 18 has guide grooves 64. When connected to the hand-held power tool 12, guide rails of the mechanical interface 20 of the hand-held power tool 12, which are not represented, bear against the guide rails 62 in the guide grooves 64.

In addition, the mechanical interface 22 of the battery pack 18 has a locking element 66. The locking element 66 is exemplarily realized as a recess in the interface housing part 52. The locking element 66 is designed to lock the battery pack 18 to the hand-held power tool 12 when in the connected state. The hand-held power tool 12 has a corresponding latching element (not represented) that, for the purpose of connection, latches into the locking element 66 of the battery pack 18 and axially fixes, or locks, the battery pack 18 when in the connected state. To release this force-fitting and form-fitting connection, the load 14 has an operating element (not represented).

The battery pack 18 exemplarily comprises twenty battery cells 70 (see FIG. 1*d*), which are located in the cell holder 50. The battery pack 18 is realized as a 36 V battery pack. The battery pack 18 is exemplarily realized as a four-layer battery pack 18. A four-layer battery pack 18 in this case is to be understood in particular to mean that the battery cells 70 are arranged in four layers, with the battery cells 70 being arranged next to each another and/or in succession substantially on one level within a layer, and within a layer the number of battery cells 70 not being less than the number of layers. The battery pack may also be realized as a one-layer, two-layer or multilayer battery pack. The different layers of the battery pack 18 have a different number of battery cells 70. It is also conceivable, however, for the layers to have the same number of battery cells.

The electrical interface 46 exemplarily has three electrical contact elements 80. When in the assembled state, the three electrical contact elements 80 are located between the holding elements 60. The electrical contact elements 80 are designed for connection to electrical contact elements, not represented, of the electrical interface 44 of the hand-held power tool 12 or to a charging device, not represented. The electrical contact elements are exemplarily realized as resilient contact elements in the form of contact tulips (not represented).

The interface housing 52 has recesses 81 in which the electrical contact elements 80 are located and via which they are designed to be accessible for electrical connection. Two of the electrical contact elements 80 are realized as power contacts 82, via which an electrical current flows during operation to supply power to the hand-held power tool 12. The two outer electrical contacts are exemplarily realized as power contacts 82.

The middle electrical contact element 80 is realized as an additional contact 86 in the form of a signal contact. Signals and information such as, for example, temperature information, a state of charge, an identification of the battery pack 18, etc. may be transmitted via the additional contact 86.

Figure 1C:
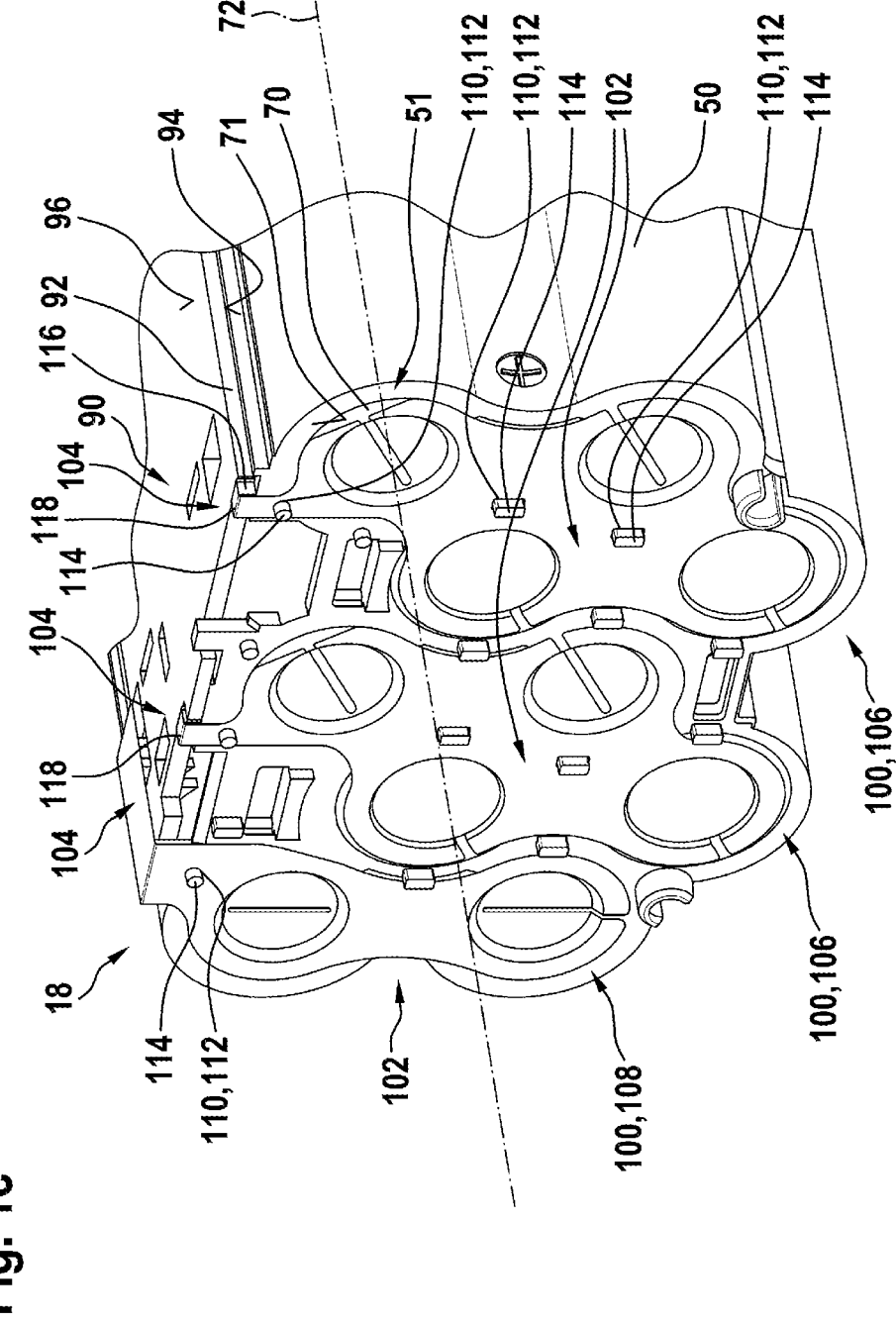
FIG. 1c shows a perspective view of the battery pack without a housing.

FIG. 1c shows a perspective partial section of the battery pack 18 without a housing 48. The cell holder 50 is exemplarily realized as a single piece, and has ten battery cells 70, in four stacked layers, each of which is located in a single cell receiver 51 of the cell holder 50. The battery cells 70 are realized as cylindrical Li-ion round cells, and on their end faces each have two cell terminals 71 that are substantially perpendicular to a longitudinal extent 72 of the battery cells 70.

The battery pack 18 also has a set of electronics 90 for controlling the battery pack 18 by open-loop or closed-loop control. The set of electronics 90 comprises a printed circuit board 92 on which the electrical contact elements 80 are located. The printed circuit board 92 additionally comprises electrical components such as, for example, a computing unit in the form of a CPU, and a memory unit. The set of electronics 90 may include one or more sensors such as, for example, temperature sensors, pressure sensors, motion sensors, humidity sensors, etc., which may be located on the printed circuit board 92. It is also conceivable for the sensors to be located elsewhere within the battery pack 18 or on the housing 48 of the battery pack 18. The printed circuit board 92 is exemplarily seated on the cell holder 50 and is supported by the latter in the housing 48 of the battery pack 18. The printed circuit board 92 has an underside 94 that faces toward the battery cells 70 and/or the cell holder 50, and an upper side 96 that faces away from the battery cells 70 and/or the cell holder 50.

The set of electronics 90 comprises a BMS, which is designed to monitor the battery pack 18. For the purpose of monitoring, information from one or more temperature sensors (not represented) of the battery pack 18, as well as individual cell voltages of the battery cells 70, are provided to the set of electronics 90.

The battery cells 70 are connected to the set of electronics 90, in particular to the printed circuit board 92, via cell connectors 100. The cell connectors 100 in this case may be electrically connected to the set of electronics 90, in particular the printed circuit board 92, for the purpose of supply power or for the purpose of individual voltage monitoring. The cell connectors 100 may be mechanically connected directly to the printed circuit board 92 or indirectly to the printed circuit board 92, for example via one of the electrical contact elements 80. The cell connectors 100 each have a cell connecting element 102 for electrical connection of the battery cells 70, and a printed-circuit-board connecting element 104 for electrical connection to the printed circuit board 92.

The battery pack 18 exemplarily has twelve cell connectors 100. FIG. 1c shows three cell connectors 100, two first cell connectors 106 being designed for providing a single cell voltage, and a second cell connector 108 for power transmission. The number of first and second cell connectors 106, 108 is to be regarded in this case as merely exemplary, as it depends on the structure of the battery pack 18 and the arrangement of the battery cells 70 in the battery pack 18.

The first cell connector 106 is exemplarily realized as a single piece and is composed of a metal, in particular of copper. The cell connecting element 102 of the first cell connector 106 is connected in a materially bonded manner to four cell terminals 71 of the battery cells 70. The materially bonded connection in this case is effected exemplarily by a welding process, in particular a resistance welding process. Thus, four battery cells 70 are electrically connected to each other via the cell connecting element 102. The cell connecting element 102 extends substantially along a cell-connector plane 101, which is parallel to the cell terminals 71 of the battery cells 70.

The cell connectors 100 each have at least one positioning element 110, which is designed for positioning the cell connectors 100. The first cell connector exemplarily 100 has three positioning elements 110, which are realized as cut-outs 112 of the cell connecting element 102 in the cell-connector plane 101. Two of the positioning elements 110 have an elongate shape, and one of the positioning elements 110 has a circular shape. The cell holder 50 has corresponding positioning elements 114, which are exemplarily realized as a single piece with the cell holder and extend in the manner of a peg toward and through the cell connector 100.

The printed-circuit-board connecting element 104 of the first cell connector 106 is connected in a materially bonded manner to the printed circuit board 92. The connection is thus effected directly to the printed circuit board 92. When in the assembled state, the printed-circuit-board connecting element 104 is in the shape of a hook. The printed-circuit-board connecting element 104 extends at least partially along a printed-circuit-board plane 93 that is spanned by the printed circuit board 92. Exemplarily, the printed-circuit-board plane 93 and the cell-connector plane 101 are substantially perpendicular to each other (see FIG. 1d).

The second cell connector 108 has a cell connecting element 102 for connecting two battery cells 70, a positioning element 110 in the cell-connector plane 101 and a printed-circuit-board connecting element 104, the printed-circuit-board connecting element 104 exemplarily being connected to a power contact 82, and thus indirectly to the printed-circuit-board 92.

The battery pack 18, in particular the cell holder 50, has a mounting element 116 for connecting the printed-circuit-board connecting element 104 to the printed circuit board 92. The mounting element 116 is exemplarily realized as a single piece with the cell holder 50. The mounting element 116 is exemplarily realized so as to be rigid, such that it substantially does not deform in the assembly process. The mounting element 116 is exemplarily realized in the form of a bar, and extends in a straight line in the direction of the printed circuit board 92. When in the connected state, the mounting element 116 is located in a cut-out 118 of the printed circuit board 92. The cut-outs 118 may be of a closed design, or of an open design as shown exemplarily. The open cut-out 118 in this case does not delimit the mounting element 116 on at least one side. The mounting element 116 is of a length that is greater than a thickness of the printed circuit board 92, and thus protrudes on the upper surface 96 of the printed circuit board 92.

Figure 1D:
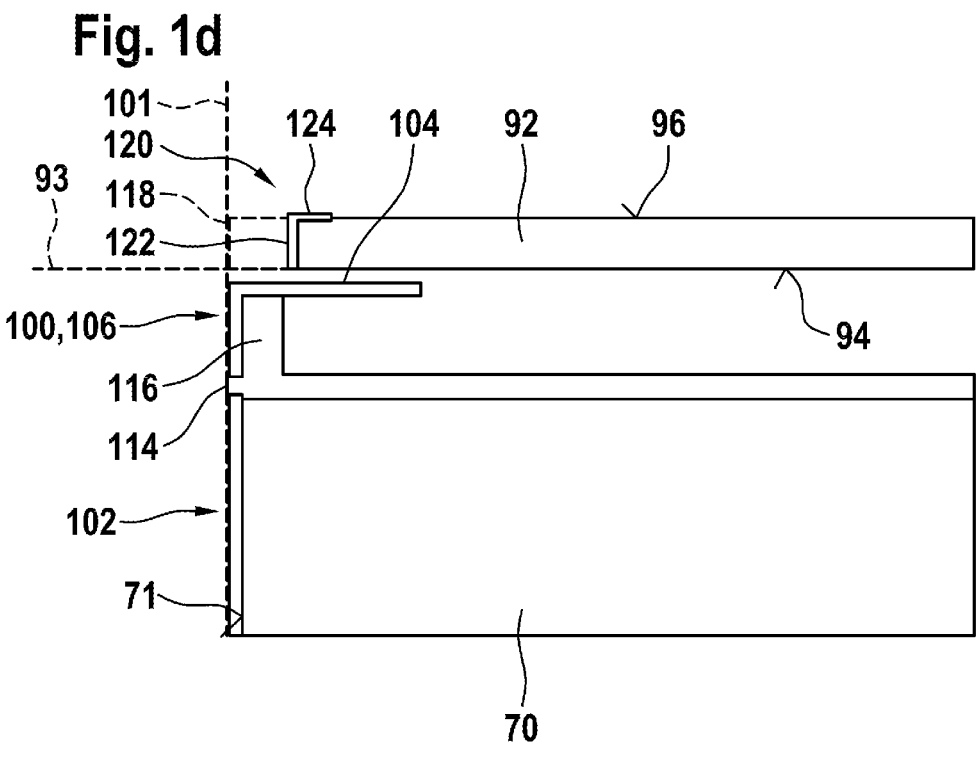
FIG. 1d shows a schematic side view before mounting of a printed circuit board of the battery pack according to FIG. 1c.

FIG. 1d shows a schematic view of the battery pack 18 before the printed circuit board 92 is mounted.

The printed circuit board 92 has a connection point 120, which is designed for electrically connecting the cell connector 100 to the printed circuit board 92. The printed circuit board 92 exemplarily has conducting tracks, not represented, which are electrically connected to the set of electronics 90 of the battery pack 18. The cut-out 118 of the printed circuit board 92 exemplarily comprises an edge metallization 122 assigned to the connection point 120. The edge metallization 122 is exemplarily made of copper. In addition, the connection point 120 comprises a contact surface 124, on the upper side 96 of the printed circuit board 92, which is also exemplarily made of copper. Alternatively, it is also conceivable for the connection point 120 to comprise only the edge metallization 122 or only the contact surface 124.

Before assembly, the cell connector 100 is connected to the cell holder 50 in such a manner that lateral movement within the cell-connector plane 101 is substantially prevented by the positioning elements 110, 114. The cell connector 100 is bent in such a manner that the printed-circuit-board connecting element 104 is substantially perpendicular to the cell-connector plane 101. The printed-circuit-board connecting element 104 lies on the mounting element 116. The printed circuit board 92 is then positioned in such a manner that the cut-out 118 is located above the mounting element 116.

Figure 1E:
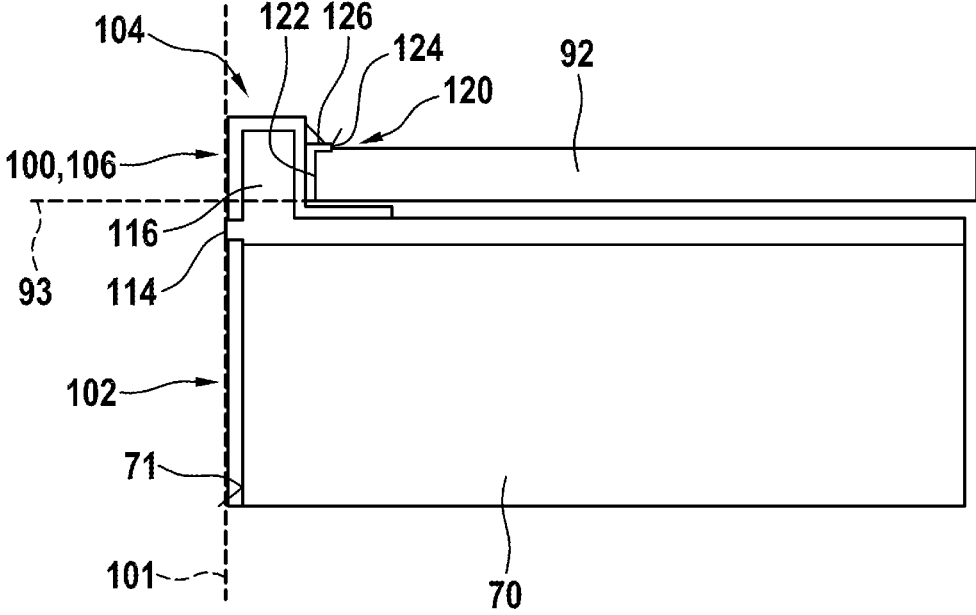
FIG. 1e shows a schematic side view after the mounting of the printed circuit board of the battery pack according to FIG. 1c.

The printed circuit board 92 is then mounted. FIG. 1*e* shows the printed circuit board 92 in the mounted state. Mounting is effected in this case by placing or pressing the printed circuit board 92 onto the cell holder 50. The cell connector 100, in particular the printed-circuit-board connecting element 104, is then deformed between the printed-circuit-board 92 and the mounting element 116. Following deformation, the printed-circuit-board connecting element 104 is in the shape of a hook and encloses the mounting element 116 on three adjoining sides. The printed-circuit-board connecting element 104 is thus located in the cut-out 118 between the mounting element 116 and the printed circuit board 92. The printed-circuit-board connecting element 104 bears against the connection point 120, in particular against the edge metallization of the cut-out 118.

The materially bonded connection is effected by means of a soldered joint. The material bonding medium 126 for the materially bonded connection maybe applied to the connection point 120 during soldering or in advance. By means of the materially bonded connection, the cell connector 100, in particular the printed-circuit-board connecting element 104 of the cell connector 100, is electrically and mechanically connected to the printed-circuit board 92, in particular to the connection point 120 of the printed-circuit board 92. The connection in this case is effected mainly via the edge metallization 122 of the cut-out 118 of the printed circuit board 92.

Figure 2A:
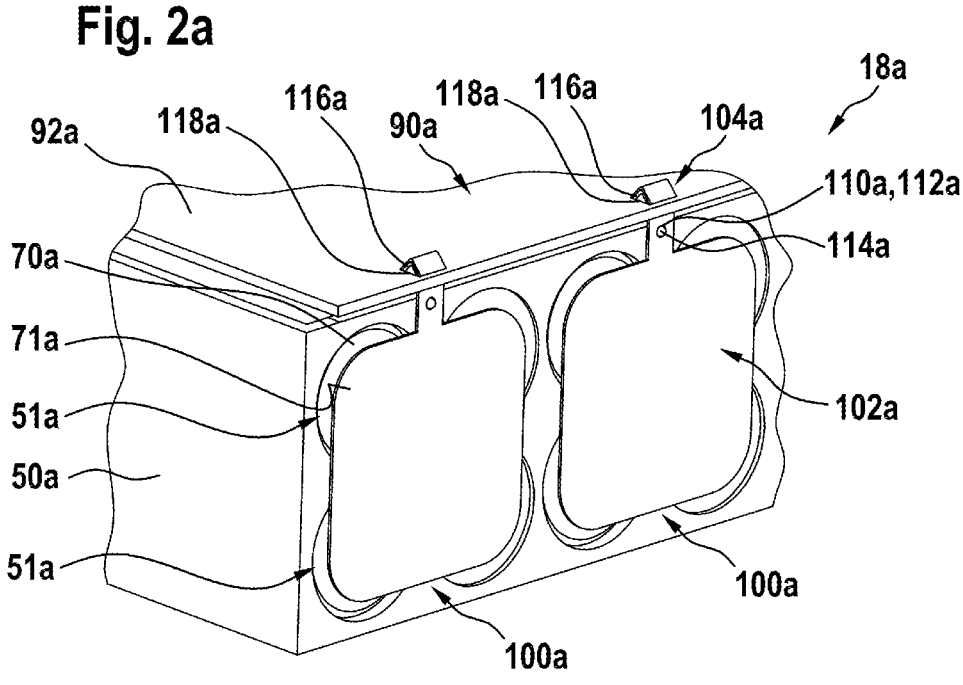
FIG. 2a shows a perspective view of a further embodiment of a battery pack.

FIG. 2*a* shows a schematic, perspective partial view of an alternative embodiment of the battery pack 18*a* with an alternative design of a cell connector 100*a*, without a housing. The cell connectors 100*a* may be designed to transmit power or to provide a single cell voltage.

Eight battery cells 70*a* are show, which are received in a cell holder 50*a*. As described above, the battery cells 70*a* in this case are each received in a single cell receiver 51*a*, the battery cells 50*a* in the single cell receiver 51*a* being substantially fully enclosed by the cell holder 50*a* along their longitudinal extent, or along their peripheral surface. The cell holder 50*a* is exemplarily made of an electrically insulating material, in particular a plastic.

The printed circuit board 92*a*, which is assigned to the set of electronics 90*a*, is located on the cell holder 50*a*. The printed circuit board 92*a* has cut-outs 118*a* via which the printed circuit board 92*a* can be connected to the cell connectors 100*a*. The cell connectors 100*a* each have a positioning element 110*a* realized as a circular cut-out 112*a*. The cell holder 50*a* has a corresponding positioning element 114*a* in the form of a peg, which projects from the end face and engages in the circular cut-out 112*a*.

Four battery cells 70*a* in each case are electrically connected to each other via their cell terminals 71*a*, via a cell connecting element 102*a* of the cell connectors 100*a*. The connection in this case is effected, exemplarily, by a laser welding process.

The battery pack 18*a* has a mounting element 116*a*, which is exemplarily realized as a single piece with the cell holder 50*a* and located in the cut-out-118*a* of the printed circuit board 92*a*.

Figure 2B:
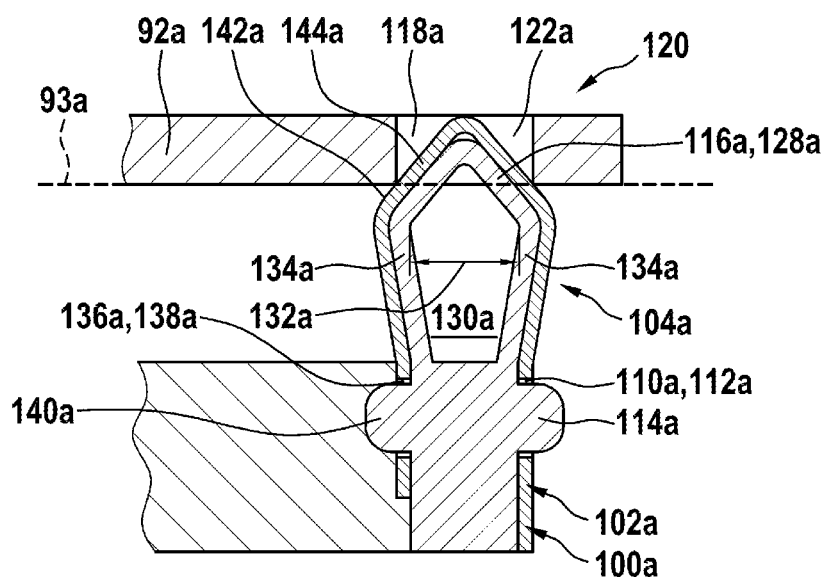
Figure 2C:
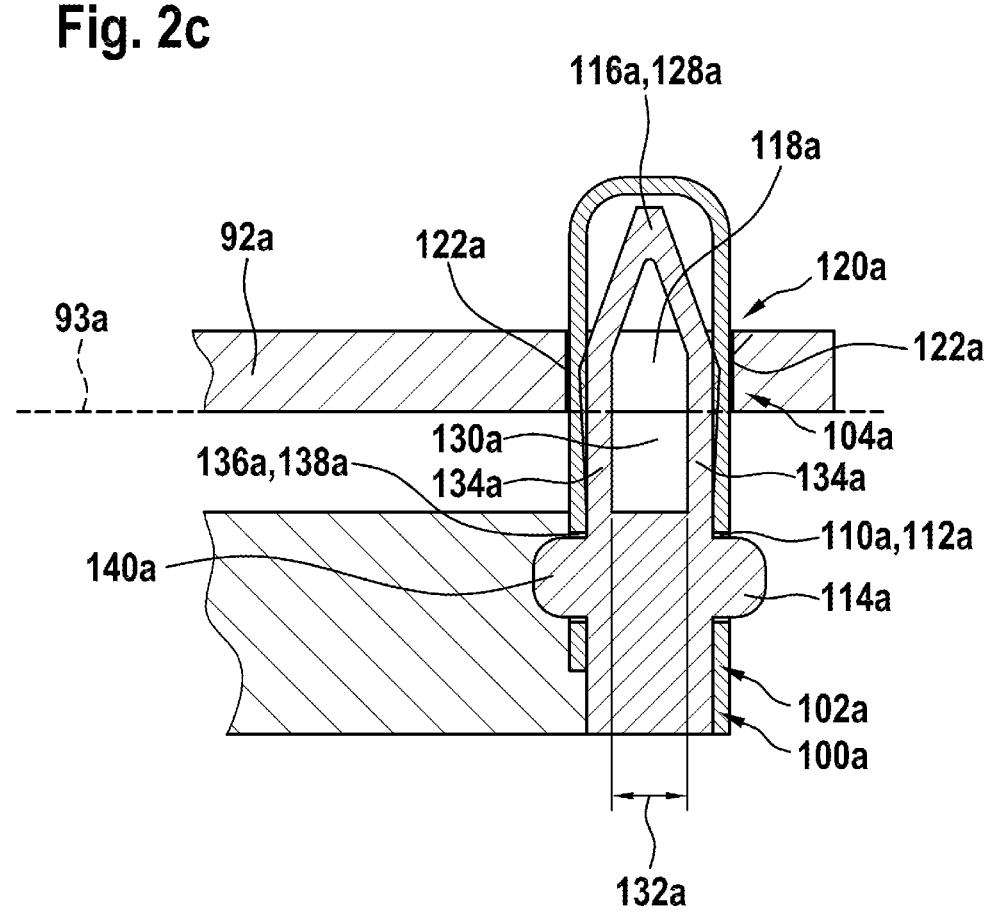

The cell connector 100*a* is connected to the printed circuit board 92*a* via a press-fit zone. The assembly process before the press-fit process is shown schematically in FIG. 2*b*, and after the press-fit process in FIG. 2*c*.

As described above, the cut-out 118*a* of the printed circuit board 92*a* has a connection point 120*a* with an edge metallization 122*a*. The cut-out 118*a* is of a closed design and fully encloses the mounting element 116*a* radially.

The cell connector 100*a* is exemplarily made of copper, with a thickness of approximately 0.3 mm. In addition, the cell connector 100*a* is realized as a single piece. The cell connector 100*a* is realized, by the choice of material and the thickness, to be of such a softness that it does not in itself have sufficient elasticity to connect the cell connector 100*a* to the printed circuit board 92*a* via a press-fit zone.

The mounting element 116*a* is designed to provide the elasticity, or force, required for the press-fit zone for the cell connector 100*a*, in particular for the printed-circuit-board connecting element 104*a*.

For this purpose, the mounting element 116*a* is realized as a spring element 128*a*. The mounting element 116*a* is in particular realized so as to be elastic in the direction of the printed-circuit-board plane 93*a*. The mounting element 116*a* exemplarily has a cavity 130*a* that, along the printed-circuit-board plane 93*a*, has a maximum width 132*a*, between two spring arms 134*a* delimiting the cavity 130*a*, that is greater than a wall thickness of the spring arms 134*a*, in particular greater than three times the wall thickness of the spring arms 134*a*.

For the purpose of mounting, the printed-circuit-board connecting element 104*a* is placed on an outer surface of the mounting element 116*a*, such that the printed-circuit-board connecting element 104*a* bears against the mounting element 116*a* on different, in particular opposite, sides.

The printed-circuit-board connecting element 104*a* has a further a positioning element 136*a*, which is exemplarily realized as a, in particular circular, cut-out 138*a*. The further positioning element 136*a* is designed to fix the position of the printed-circuit-board connecting element 104*a* during the press-fit process. The cell holder 50*a* has a corresponding further positioning element 140*a* located on a side that is opposite the first positioning element 114*a*.

The printed-circuit-board connecting element 104*a*, preferably the printed-circuit-board connecting element 104*a* and the mounting element 116*a*, have a width along the printed-circuit-board plane 93*a* that is realized so as to be greater than a width of the cut-out 118*a* of the printed-circuit board 92.

In the press-fit process, the printed-circuit board 92*a* is pressed onto the printed-circuit-board connecting element 104*a*. This causes an edge 142*a* of the cut-out of the printed-circuit-board 92*a* to come into contact with a slope 144*a* of the printed-circuit-board connecting element 104*a* and to apply a force to it. The slope 144*a* is realized in particular in such a manner that a force acting substantially perpendicularly to the printed-circuit-board plane 93*a* is at least partially converted into a radially inwardly directed force and compresses the printed-circuit-board connecting element 104 and the mounting element 116*a*. The slope 144*a* exemplarily has a constant slope angle which, in relation to the printed-circuit-board plane 93a, is preferably in a range of between 30° and 60°.

The applied force causes the printed-circuit-board connecting element 104a and the mounting element 116a to be deformed in such a manner that the printed-circuit-board connecting element 104a with the mounting element 116a can be guided into the cut-out 118a of the printed-circuit board 92a and extends through it.

In this case the printed-circuit-board connecting element 104a itself undergoes plastic deformation, while the mounting element 116a undergoes elastic deformation. The inner mounting element 116a applies a radially outwardly directed force to the printed-circuit-board connecting element 104a, as a result of which an elastic component is also imparted to the printed-circuit-board connecting element 104a.

The spring element 128a, or the mounting element 116a, is realized in such a manner that the force exerted by the mounting element 116a results in a stable mechanical and electrical connection between the printed-circuit-board connecting element 104a and the printed-circuit board 92a.

FIG. 3a to FIG. 3c show a schematic partial view of an assembly process in which a cell connector 100b is connected in a materially bonded manner to a printed circuit board 92b by means of a hot-stamp process. The battery pack 18b may in principle be realized like the battery packs 18, 18a described above, and the cell connector 100b may be designed for power transmission or for monitoring a single cell voltage.

The cell connector 100b has a cell connecting element 102b, which is designed to electrically connect two battery cells 70b. The material bond between the cell connector 100b and the battery cells 70b, in particular the cell terminals 71b of the battery cells 70b, is effected in this case via a respective connection surface 146b of the cell connector 100b, which exemplarily bears fully against the cell terminal 71b of the battery cell 70b. Thus, in this embodiment, a contact region 148b substantially corresponds to the connection surface 146b.

In the region of the connection surfaces 146b the cell connecting element 102b is exemplarily realized in the shape of a pot, the connection surface 146b forming a bottom of the pot, which is enclosed by a cylindrical wall 150b.

For the purpose of assembly, the cell connector 100b is first positioned on the cell holder 50b by means of a positioning element 110b. The cell connector 100b is exemplarily realized as a single piece. Before assembly, both the printed-circuit-board connecting element 104b and the cell connecting element 102b extend substantially fully along the cell-connector plane 101b.

The printed circuit board 92b is located on the cell holder 50a. On the upper side 96b, which faces away from the battery cells 70b, the printed circuit board 92b has a connection point 120b, which is provided for connection to the cell connector 100b, in particular to the printed-circuit-board connecting element 104b of the cell connector 100b. The connection point 120b in this case is located only on the upper side 96b of the printed circuit board 92b. The connection point 120b has a contact surface 124b for producing a soldered joint, for example in the form of a contact pad, in particular a copper contact pad.

Following positioning, the cell connector 100b is bent and deformed manually, or by means of an assembly device, not represented. For example, the cell connector 100b is bent by 90°, such that the printed-circuit-board connecting element 104b of the cell connector 100b is substantially parallel to the printed-circuit-board plane 93b. The cell connector 100b is bent in such a manner that the printed-circuit-board connecting element 104b bears against the connection point 120b, in particular the contact pad 124b. Alternatively, it is also conceivable for the printed-circuit-board connecting element 104b to be at a certain distance to the connection point 120b. The battery pack 18b has a cell-connector guide element, not represented, which is designed to guide the cell connector when being bent during the assembly process.

The material bond is then effected by means of the hot-stamp process. For the purpose of producing the soldered joint, a hot-stamp device 152b is heated and applied, in particular with the action of force, to the printed-circuit-board connecting element 104b above the connection point 120b, preferably above the contact surface 124b.

Figure 3D:
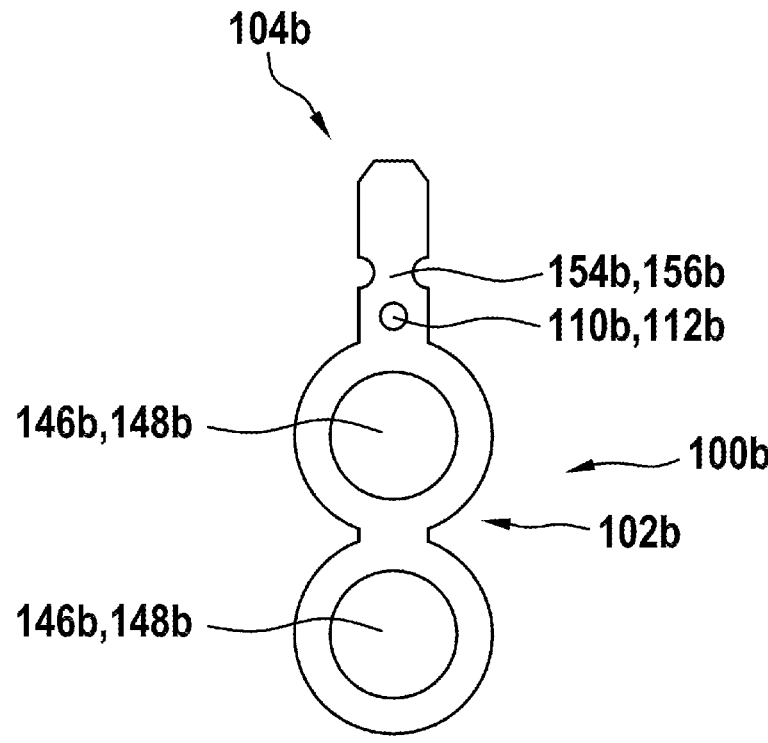

FIG. 3d shows a side view of the cell connector 100b. Between the printed-circuit-board connecting element 104b and the cell connecting element 102b the cell connector 100b has a bending aid 154b, which is provided to assist the bending process. The bending aid 154b is exemplarily realized as a narrowing 156b. The bending aid 154b in the form of a material reduction in the bending region is provided in this case for cell connectors 100b that are difficult to deform plastically. The bending aid may also be realized by the choice of material and the material thickness, in which a region between the printed-circuit-board connecting element 104b and the cell connecting element 102b that can be bent over with little force is created.

Figure 4A:
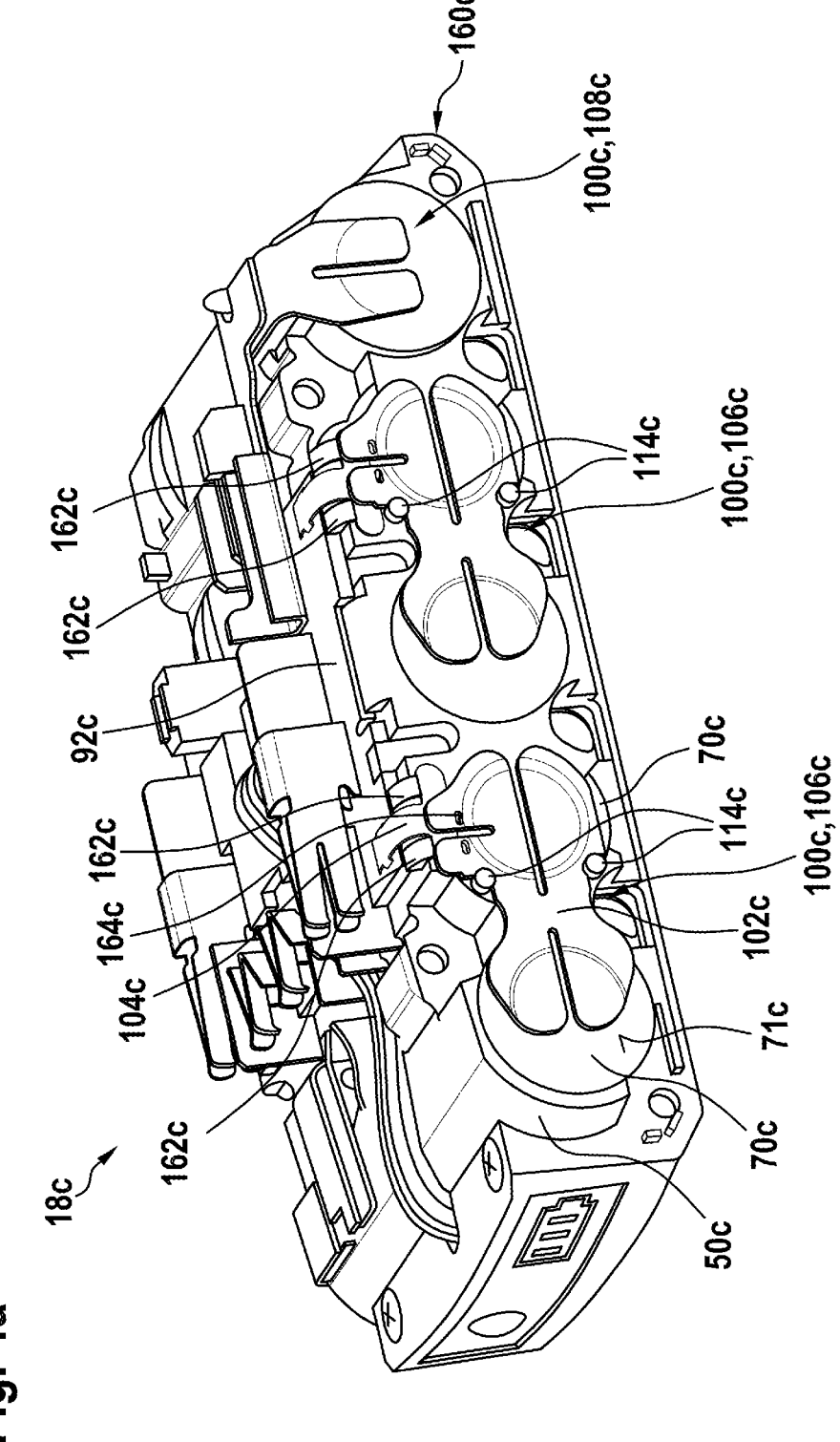
FIG. 4a shows a perspective view of a further embodiment of a battery pack without a housing.

FIG. 4a shows a perspective view of a further embodiment of a battery pack 18c with cell connectors 100c, without the complete housing of the battery pack 18c.

The battery pack 18c is realized as a one-layer battery pack 18c having five battery cells 70c. The battery cells 70c are received in a cell holder 50c in an electrically isolated and thermally coupled manner.

The battery pack 18c exemplarily comprises six cell connectors 100c, with three cell connectors 100c being located on one side in each case. In particular, the battery pack 18c has two first cell connectors 106c per side for monitoring a single cell voltage, and a second cell connector 108c for power transmission.

When in the assembled state, the cell connectors 100c are realized as a single part, the cell connecting element 102c and the printed-circuit-board connecting element 104c being realized from different components and connected to each other in a materially bonded manner.

Figure 4B:
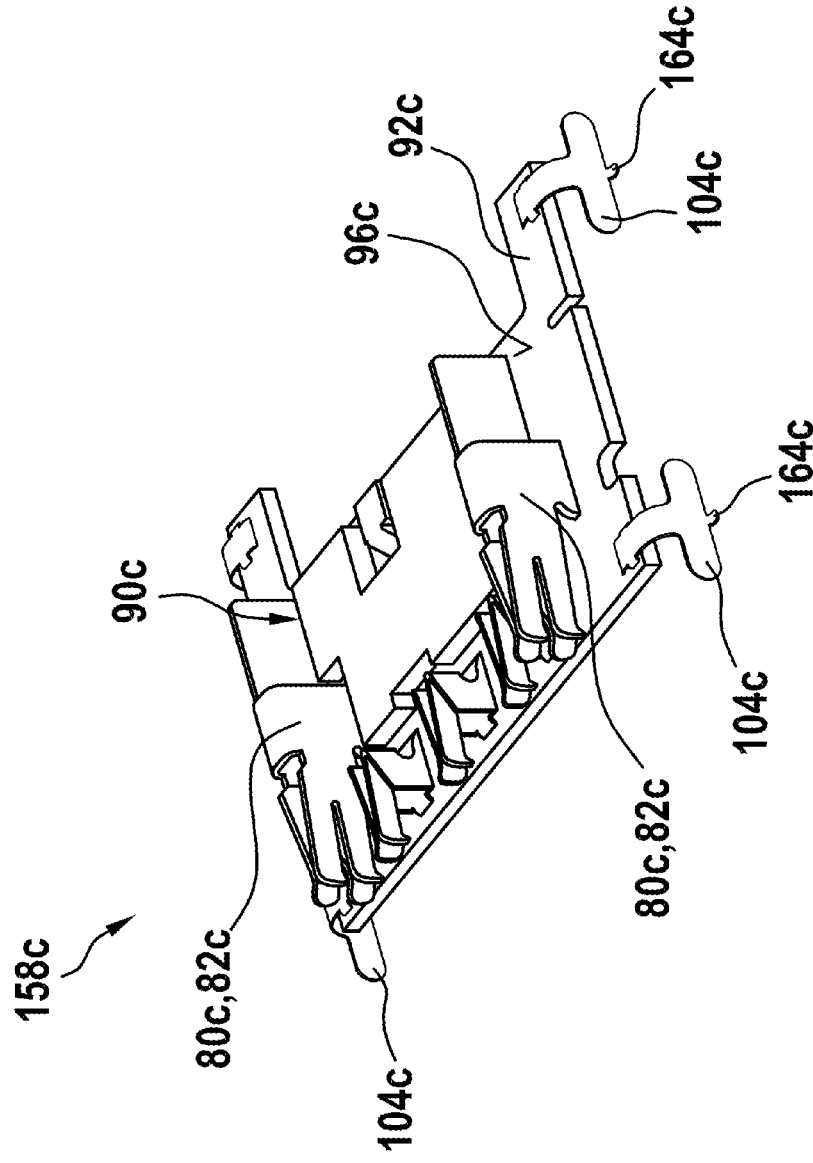

In FIG. 4b, in a perspective view, shows the printed circuit board 92c of the battery pack 18c, on which the electrical contact elements 80c and the set of electronics 90c are located.

The printed circuit board 92c is connected to the printed-circuit-board connecting element 104c via a material bond. The material bond in this case is effected by means of a soldered joint on the upper side 96c of the printed circuit board 92c. The printed circuit board 92c connected to the printed-circuit-board connecting elements 104c forms a first assembly module 158c. The printed-circuit-board connecting element 104c has a first material bond region by which the printed-circuit-board connecting element 104c is connected to the printed-circuit board 92 by means of a soldered joint. In addition, the printed-circuit-board connecting element 104c has a second material bond region provided for connecting the printed-circuit-board connecting element 104c to the cell connecting element 102c by means of a material bond. The first material bond region and the second material bond region of the printed-circuit-board connecting element 104c extend exemplarily along different planes. The first material bond region extends substantially along the printed-circuit-board plane, and the second material bond region extends substantially along the cell-connector plane.

The first assembly module 158c is connected to a second assembly module 160c. The second assembly module 160c comprises the cell holder 50c with inserted battery cells 70c.

The battery pack 18c, preferably the cell holder 50c, has positioning elements 162c that are designed for positioning, or fixing, the printed-circuit-board connecting element 104c, or the first assembly module 158c, on the second assembly module 160c. The positioning elements 162c are realized as form-fit elements, which are provided to realize an undercut between the first assembly module 158c and the second assembly module 160c.

In a subsequent assembly step, the cell connecting element 102c is positioned on the assembly modules 158c, 160c, the battery pack 18c having a plurality of positioning elements 114c for positioning the cell connecting element 104c. In addition, the printed-circuit-board connecting element 104c also includes a positioning element 164c that engages in a corresponding positioning element of the cell connecting element 102c. The printed-circuit-board connecting element 104c and the cell terminals 71c of the battery cells 70c to be connected are located on the same side of the cell connecting element 102c. Thus, the printed-circuit-board connecting element 104c and the cell connecting element 102c partially overlap when in the assembled state.

The cell connecting element 102c is connected to the battery cells 70c via a first material bond and to the printed-circuit-board connecting element 104c via a second material bond, the first material bond and the second material bond being effected by means of the same connection technique. Exemplarily, the connection technique is a welding process, preferably a resistance welding process by means of two welding spots in each case. Alternatively, a laser welding process or a soldering process is also conceivable. In this case, the first and the second material bond are effected substantially on the same plane, in particular the cell-connector plane 101c. Advantageously, this can simplify and accelerate the assembly process.

The materials of the printed-circuit-board connecting element 104c and of the cell connecting element 102c are selected in such a manner that it is possible to effect the first material bond and the second material bond by means of the same connection technique, for example a copper-tin or a copper-zinc alloy. The printed-circuit-board connecting element 104c and the cell connecting element 102c may be made from different materials or substantially the same material.

Figure 5A:
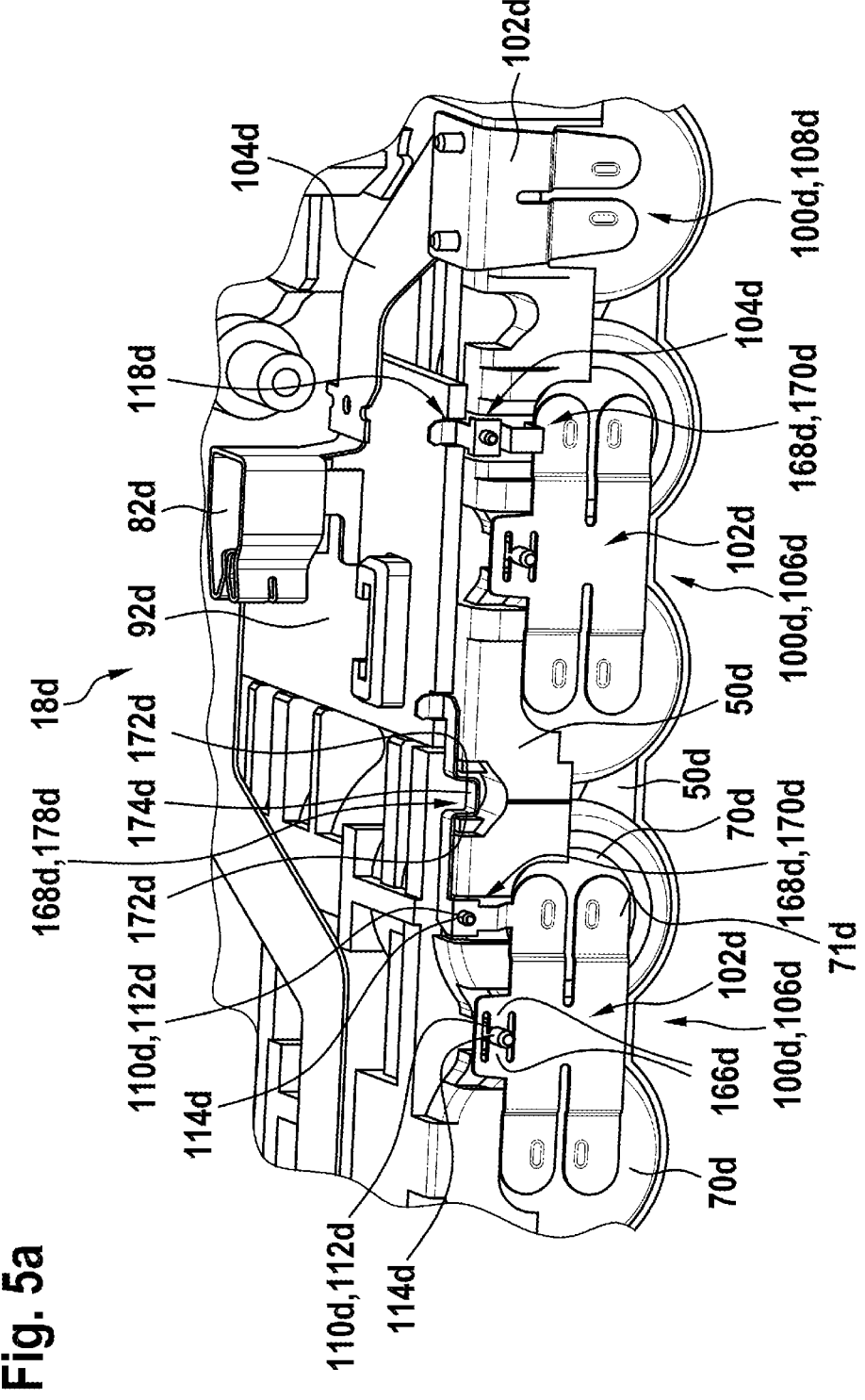
FIG. 5a shows a perspective partial view of a further embodiment of a battery pack without a housing.
Figure 5B:
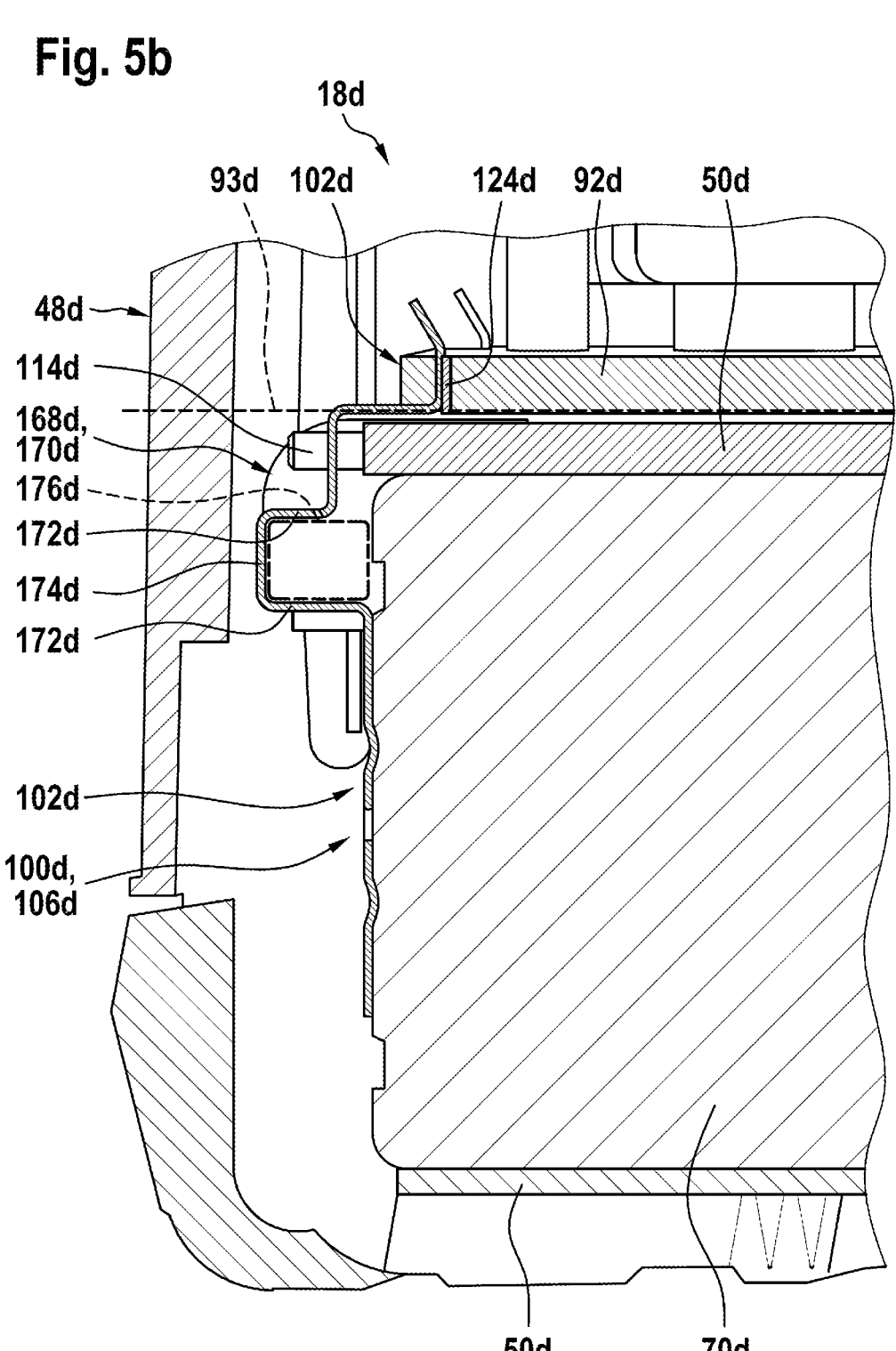

FIG. 5a shows a perspective view of a further embodiment of a battery pack 18d with cell connectors 100d, without the housing 48d (see FIG. 5b).

The battery pack 18d is realized as a one-layer battery pack 18d having five battery cells 70d. The battery cells 70d are received in a cell holder 50d. The cell holder 50d is realized in two parts, with cavities located between the two components. In the region of the cavities, there is only an air gap between two adjacent battery cells 70d.

The battery pack 18d exemplarily comprises six cell connectors 100d, with three cell connectors 100d being located on one side in each case. In particular, the battery pack 18d has two first cell connectors 106d per side for monitoring a single cell voltage, and a second cell connector 108d for power transmission.

The first cell connectors 106d are realized as a single piece, and the second cell connectors 108d are realized as a single part that is composed of two components.

The first cell connectors 106d have a cell connecting element 102d that connects two battery cells 70d to each other via a material bond. The material bond is effected, exemplarily, by means of a welded joint. In addition, the first cell connectors 108d have a printed-circuit-board connecting element 104 that is connected to the printed circuit board 92d of the battery pack 18d via a material bond. The material bond is effected, exemplarily, by means of a soldered joint with an edge metallization 122d of a cut-out 118d of the printed circuit board 92d (see FIG. 5b).

The first cell connectors 106d each exemplarily have two positioning elements 110d. The positioning elements 110d are realized in the form of cut-outs 112d. The positioning elements 110d are designed for connecting the cell connectors 100d to the cell holder 50d in a form-fitting manner, the positioning elements 110d being realized in such a manner that the cell connector can only be released by a translatory movement. For assembly, the cell connectors 106d are thus placed laterally, along the longitudinal extent 72d of the battery cells 70d, on corresponding positioning elements 114d of the cell holder 50d in the form of pins.

In addition, one of the positioning elements 110d in each case has a restoring means 166d that applies a force, exemplarily a force in the radial direction, to the cell holder 50d, in particular to the corresponding positioning element 114d of the cell holder 50. The restoring means 166d are exemplarily realized as spring plates, which reduce the size of the cut-out 114 and are partially bent in the connection process. Advantageously, a lateral movement of the cell connector 100d is thereby prevented by means of the positioning element 110d, and removal or attachment by friction is made more difficult.

In the event of a strong mechanical force acting upon the battery pack 18d, for example in the event of a fall, damage can be caused in the region of the material bonds in the case of rigidly connected cell connectors 100d. To counteract this effect, the first cell connectors 106d each have at least one strain relief element 168d.

The middle cell connector 100d has a single strain relief element 168d, realized as a vertical strain relief element 170d. The vertical strain relief element 170d is located between the printed-circuit-board connecting element 104d and the cell connecting element 102d, in particular between the two material bonds with the battery cells 70d and the printed-circuit board 92d.

The strain relief elements 168d are exemplarily realized in the shape of a step, in particular in a U shape. FIG. 5b shows a cross-section of the vertical strain relief element 170d. The strain relief elements 168d have two elastic arms 172d, which are connected to each other via a back 174d. In the relaxed state, the arms 172d and the back 174d are, respectively, parallel and perpendicular to each other. In the assembled state, there is a cavity 176d between the two arms 172d, such that the strain relief elements 168d are also elastic when in the assembled state.

The strain relief elements 168d, in particular the arms 172d of the strain relief elements 168d, extend transversely, in particular perpendicularly, to the operative direction of the strain relief elements 168. The back 174d of the strain relief element 168d extends substantially along the operative direction of the strain relief element 168d.

The vertical strain relief element 170d is arranged in such a manner that the arms 172d of the vertical strain relief elements 170d extend substantially parallel to the printedcircuit-board plane 93d. The battery cells 70d connected to the printed circuit board 92d via the cell connector 100d with the vertical strain relief element 170d lie directly beneath the printed circuit board 92d, and are thus protected by an elastic deformation of the strain relief element 168d in the case of a relative movement of the battery cells 70d toward or away from the printed circuit board 92d.

The left cell connector 100d has two strain relief elements 168d. One vertical strain relief element 170d as described above, and a further, horizontal strain relief element 178d.

The horizontal strain relief element 178d also has two resilient arms 172d which are connected to each other by a back 174d. The arms 172d in this case are substantially perpendicular to the printed-circuit-board plane 93d, and the back 174d is substantially parallel to the printed-circuit-board plane 93b.

The battery cells 70d connected to the printed circuit board 92d via the cell connector 100d with the horizontal strain relief element 178d lie in an offset manner beneath the printed circuit board 92d, and are thus protected by an elastic deformation of the strain relief element 168d in the case of a relative movement of the battery cells 70d toward or away from the printed circuit board 92d.

The vertical strain relief element 170d and the horizontal strain relief element 178d thus have different, in particular mutually perpendicular, operative directions. The vertical strain relief element 170d extends substantially away from the battery cells 70d, in particular in the direction of the housing 48d. The horizontal strain relief element 178d extends toward the battery cells 70d.

Figure 5C:
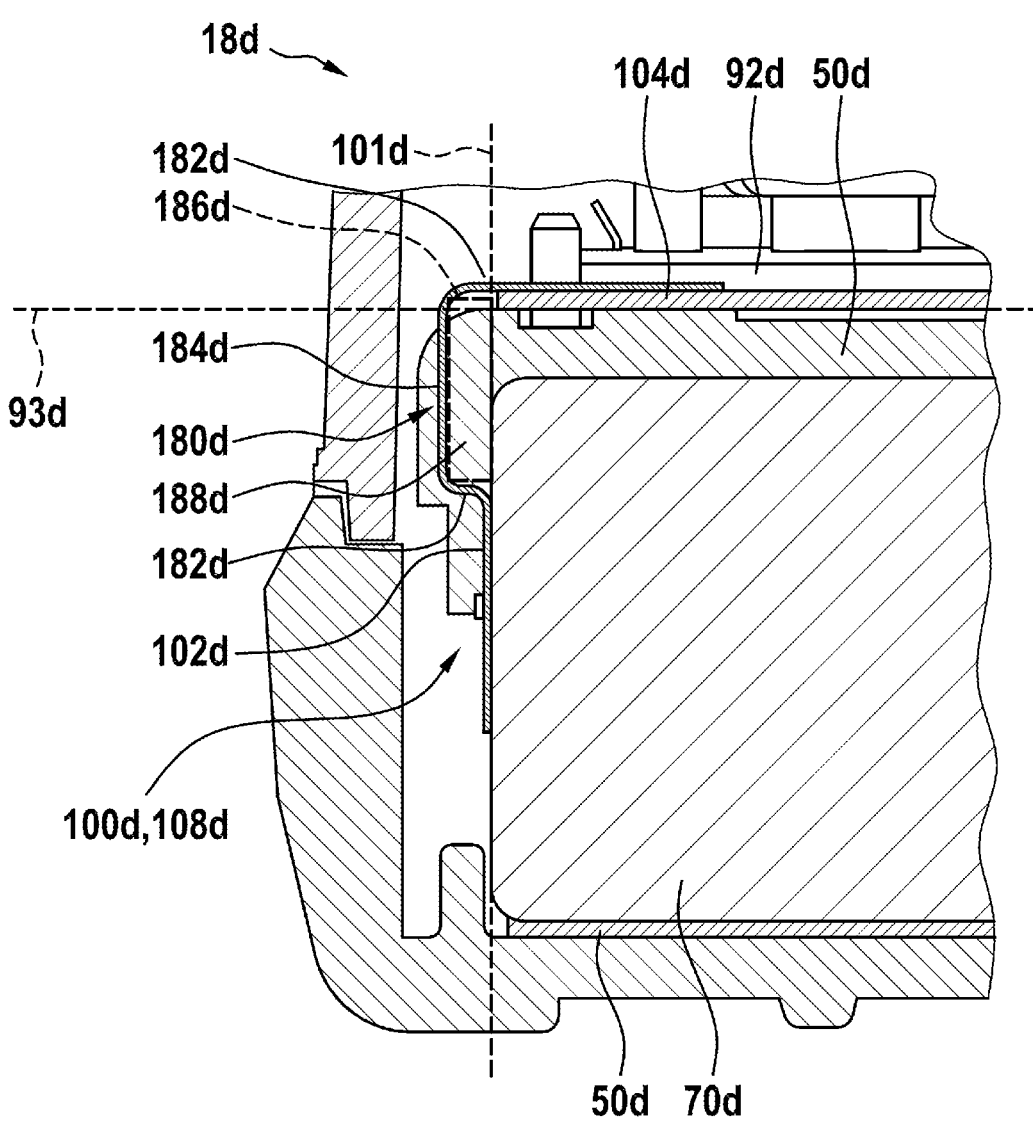

The second cell connector 108d is composed of the printed-circuit-board connecting element 104d and the cell connecting element 102d, and is shown in cross-section in FIG. 5c. The printed-circuit-board connecting element 104d is connected in a materially bonded manner to a power contact 82d on the printed circuit board 92d. The cell connecting element 102d is connected in a materially bonded manner to a single battery cell 70d by means of a resistance welding process.

The printed-circuit-board connecting element 104d extends substantially fully along, or parallel to, the printed-circuit-board plane 93d. The cell connecting element 102d extends both along the cell-connector plane 101d and partially along the printed-circuit-board plane 93d, such that the printed-circuit-board connecting element 104 and the cell connecting element 102d partially overlap. Both the printed-circuit-board connecting element 104d and the cell connecting element 102d have positioning elements 110d in the form of circular cut-outs 112d, which are held for positioning by a positioning element 114d of the cell holder 50d in the form of a pin. The cell connecting element 102d is mounted after the printed-circuit-board connecting element 104d. As a result, the printed-circuit-board connecting element 104d is located between the cell connecting element 102d and the cell holder 50d and is locked by the cell connecting element 102d against detachment.

The printed-circuit-board connecting element 104d is connected to the cell connecting element 102d via a material bond, in particular by means of a welding process. The material bond is not effected on the side of the cell terminals 71d, but on a side that is substantially perpendicular to the cell-connector plane 101d.

To simplify assembly, the second cell connector 108d, in particular the cell connecting element 102d of the second cell connector 108d, has a locking element 180d. The locking element 180d is realized in such a manner that detachment of the cell connecting element 102d, in particular before a materially bonded connection to the battery cell 70d or to the printed-circuit-board connecting element 104d, is not possible via a translatory movement.

The locking element 180d is realized in the form of a step and has two mutually opposite arms 182d, which are connected to each other via a back 184d. The arms 182d and the back 184d delimit a cavity 186d which, in contrast to the previously described strain relief element 168d, at least partially receives a stop element 188d when in the assembled state. The stop element 188d is exemplarily realized as a single piece with the cell holder 50d. In the assembled state, the locking element 180d substantially bears against at least one, for example two, adjoining sides of the stop element 188d. The positioning element 114d of the cell holder thus substantially prevents a translatory movement of the cell connecting element 102d along the printed-circuit-board plane 93b. The stop element 188d additionally prevents translatory movement of cell connecting element 102d perpendicular to the printed-circuit-board plane 93d. To ensure mountability, the positioning elements 110d and the locking element 180d are configured in such a manner as to allow movement with some play. Mounting of the cell connecting element 102d is effected by a swiveling process in which the cell connecting element 102d is partially elastically deformed.

Figure 6:
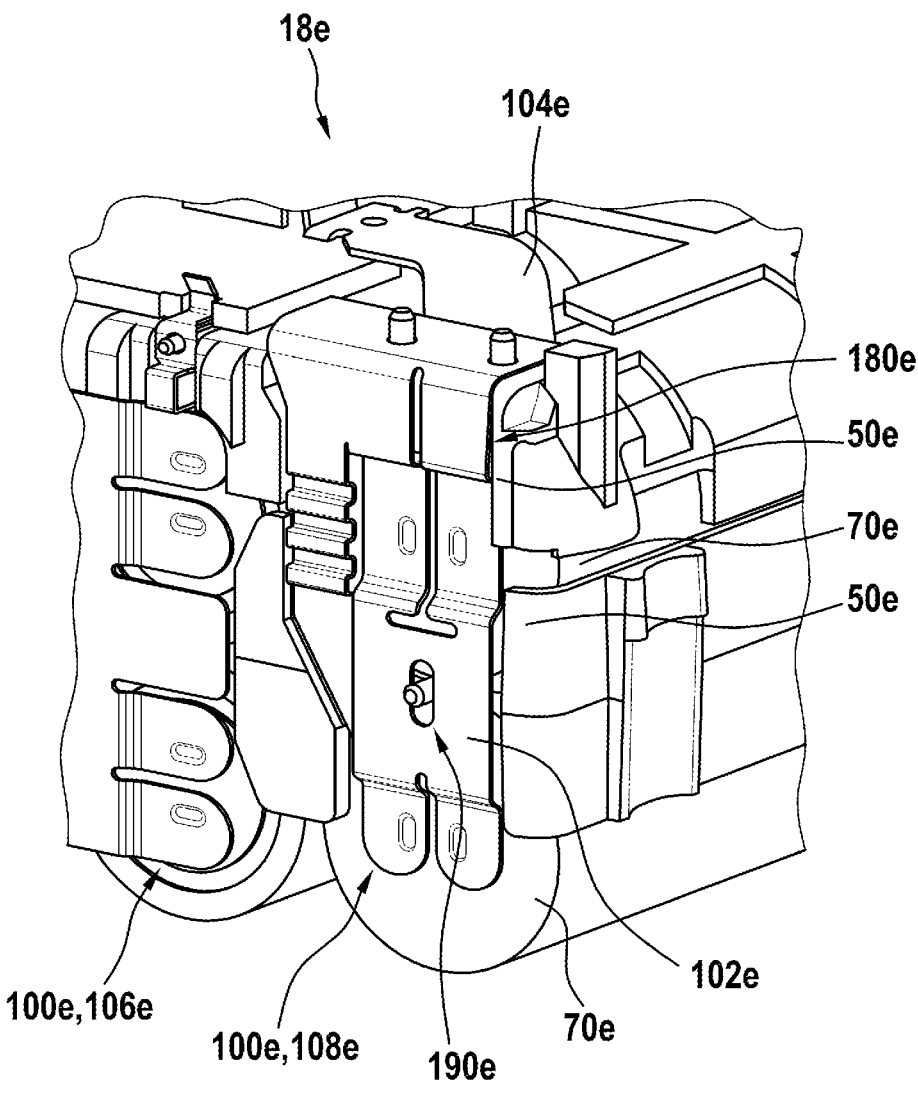
FIG. 6 shows a perspective partial view of a further embodiment of a battery pack without a housing.

FIG. 6a shows a perspective partial view of a further embodiment of the second cell connector 108d according to FIG. 5a. The battery pack 18e is realized as a two-layer battery pack 18e having in each case five battery cells 70e in a layer, the battery cells 70e being arranged in a multipart cell holder.

The battery pack 18e has first cell connectors 106e and second cell connectors 108e. Like the previous exemplary embodiment, the second cell connectors 108e have a printed-circuit-board connecting element 104e and a cell connecting element 102e, the cell connecting element 102e having a locking element 180e. In addition, the cell connecting element 102e is of a greater length, as it electrically interconnects two battery cells 70e. For this reason, the second cell connector 108e has an additional guide 190e.

Figure 7A:
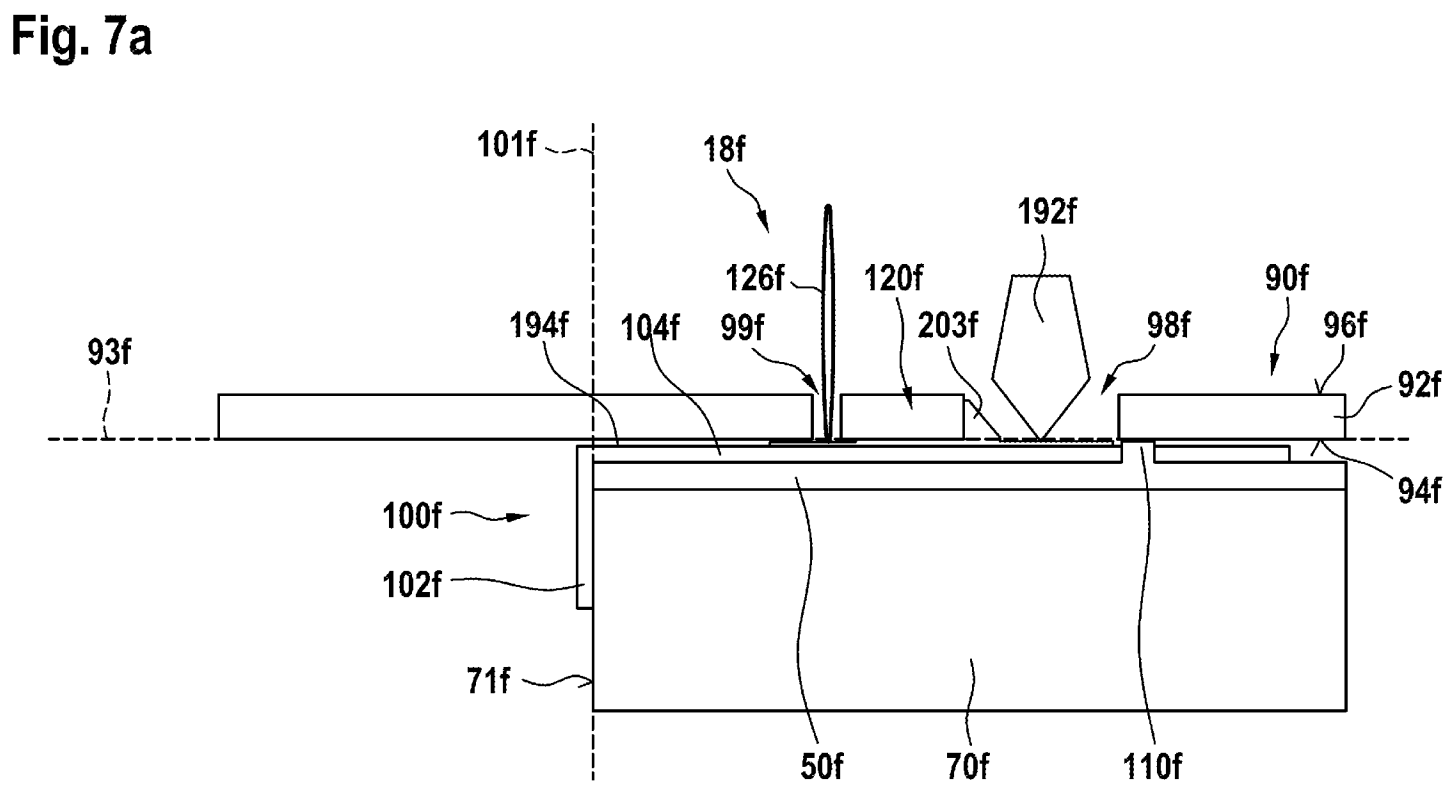

FIG. 7a shows a schematic side view of a further alternative embodiment of a battery pack 18f with a cell connector 100f.

As described previously, in the battery pack 18f the battery cells 70f are located in a cell holder 50f and are connected via a cell connector 100f to a set of electronics 90f, in particular a printed circuit board 92f.

The cell connector 100f is exemplarily designed to monitor single cell voltages. The cell connector 100f is exemplarily realized as a single piece. The cell connecting element 102f of the cell connector 100f is connected in a materially bonded manner, for example by means of a resistance welding process, to a cell terminal 71f of the battery cell 70f. The cell connecting element 102f spans a cell-connector plane 101f, which is substantially perpendicular to a printed-circuit-board plane 93f that is spanned by the printed circuit board 92f.

The printed-circuit-board connecting element 104f is provided for materially bonded connection to the printed circuit board 92f. The printed-circuit-board connecting element 104f extends along, or parallel to, the printed-circuit-board plane 93f and is held on the cell holder 50f by means of a positioning element 110f. The printed-circuit-board connecting element 104f is seated on the cell holder 50f. The printed-circuit-board connecting element 104f is located entirely between the cell holder 50f and the printed-circuit board 92*f*. The printed-circuit-board connecting element 104*f* is thus located on an underside 94*f* of the printed-circuit board 92*f*.

On it underside 94*f*, the printed circuit board 92*f* has a connection point 120*f* designed for electrical connection to the battery cell 70*f*, in particular to the printed-circuit-board connecting element 104*f* of the cell connector 100*f*. The connection point 120*f* may have, for example, a solder pad in the form of a copper pad.

The printed circuit board 92*f* further comprises a first cut-out 98*f* and a second cut-out 99*f* located adjacent to the connection point 120*f*. In particular, the connection point 120*f* is located between the first cut-out 98*f* and the second cut-out 99*f*. The cut-outs 98*f*, 99*f* are provided for producing a materially bonded connection, in particular a soldered joint, between the cell connector 100*f* and the printed circuit board 92*f*. The cut-outs 98*f*, 99*f* are exemplarily realized separately from each other, but it is also conceivable for the first cut-out 98*f* and the second cut-out 99*f* to be realized as one large single cut-out.

The first cut-out 98*f* is designed for introducing thermal energy. Thermal energy is introduced, exemplarily, via a contact of a connection device, in particular a soldering device 192*f*. The soldering device 192*f* may be realized, for example, as a hot-stamp or a soldering iron, as described previously. The printed-circuit-board connecting element 104*f* is located in such a manner that the printed-circuit-board connecting element 104*f* is exposed in the region of the first cut-out 98*f*, such that the soldering device 192*f* can dip into the cut-out 98*f* and act directly upon the printed-circuit-board connecting element 104*f*. The cell connector 100*f* can thus be heated directly by means of the soldering device 192*f*.

The second cut-out 99*f* is provided for introducing a material bonding medium 126*f*. The material bonding medium 126*f* may be realized, exemplarily, as a solder wire or solder paste. The second cut-out 99*f* is smaller than the first cut-out 98*f*. The printed-circuit-board connecting element 104*f* is located in such a manner that the printed-circuit-board connecting element 104*f* is exposed in the region of the second cut-out 99*f*, such that the material bonding medium can dip into the cut-out 99*f* and act directly upon the printed-circuit-board connecting element 104*f*.

During the soldering process, the cell connector 100*f* is heated by the soldering device 192*f* and the heat is transferred via the cell connector 100*f* to the material bonding medium 126*f*, such that the latter melts and is distributed between the cell connector 100*f*, in particular the printed-circuit-board connecting element 104*f*, and the printed-circuit board 92*f*, in particular the connection point 120*f*, and connects them electrically and firmly to one another. An air gap 194*f* between the printed circuit board 92*f* and the cell connector 100*f* is realized in such a manner that this process is assisted by capillary forces. Alternatively or additionally, it is also conceivable for a flux to be added, which further promotes the propagation of the solder.

Figure 7B:
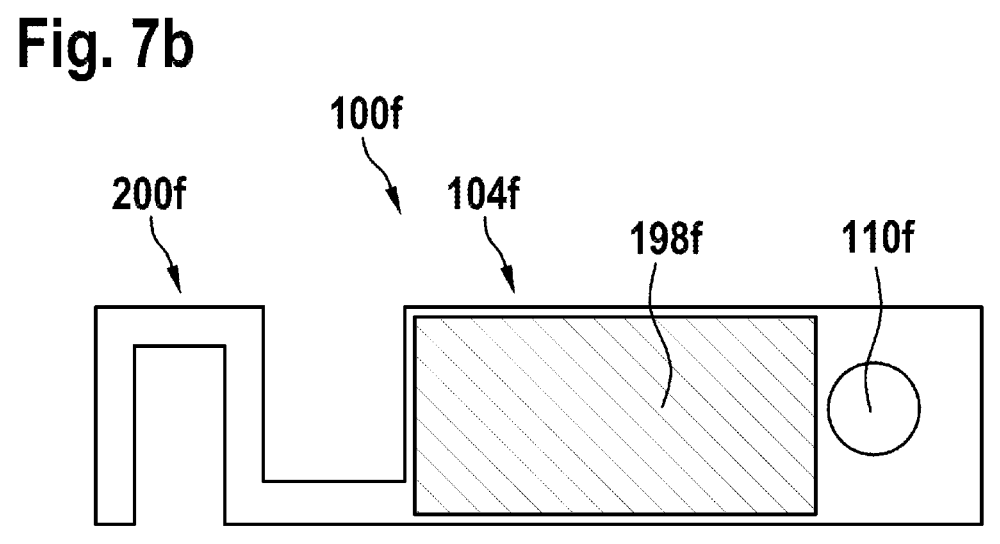

FIG. 7*b* shows a schematic side view of the printed-circuit-board connecting element 104*f*, in a viewing direction perpendicular to the printed-circuit-board plane 93*f*.

The printed-circuit-board connecting element 104*f* may optionally have a coating of the material bonding medium 126*f* in the connection region 198*f* provided for connection to the connection point 120*f*.

The cell connector 100*f* additionally has a heat dissipation limiting element 200*f*, which is located outside the connection point 120*f*, or outside the connection region 198*f*. The heat dissipation limiting element 200*f* is designed to reduce the removal of heat from the connection region 198*f* during the soldering process. The heat dissipation limiting element 200*f* is located between the printed-circuit-board connecting element 104*f* and the cell connecting element 102*f*. The heat dissipation limiting element 200*f* is realized, exemplarily, as a single piece with the cell connector 100*f*. In an alternative, single-part design of the cell connector 100*f*, in which the cell connector 100*f* is composed of a plurality of materially bonded parts, the heat dissipation limiting element 200*f* may also be composed of a material that is electrically conductive but thermally inferior to the material of which the printed-circuit-board connecting element 104*f* is composed. The heat dissipation limiting element 200*f* is exemplarily realized as a material reduction in the form of a meander structure.

To optimize the connection, a suitable device may be used to apply pressure to the printed circuit board 92*f* in the region of the connection point 120*f*, in the direction of the cell connector 100*f*, during the soldering process, thereby reducing the air gap 194*f*.

Preferably, the printed-circuit-board connecting element 104*f* lies in the region of the connection point 120*f* on a thermally stable material that does not melt during the soldering process, or only partially melts, such that the function of the battery pack 18*f* is not impaired. For example, the cell holder 50*f* may be made of a thermally stable material. Alternatively, it is also conceivable for there to be a thermally stable intermediate element, for example a Kapton foil, located between the cell holder 50*f* and the cell connector 100*f*.

Figure 7D:
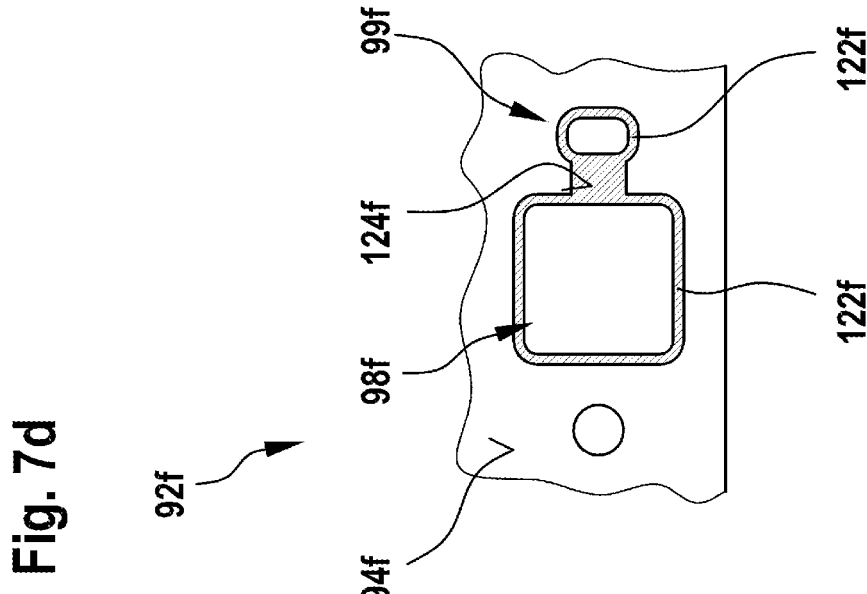
Figure 7C:
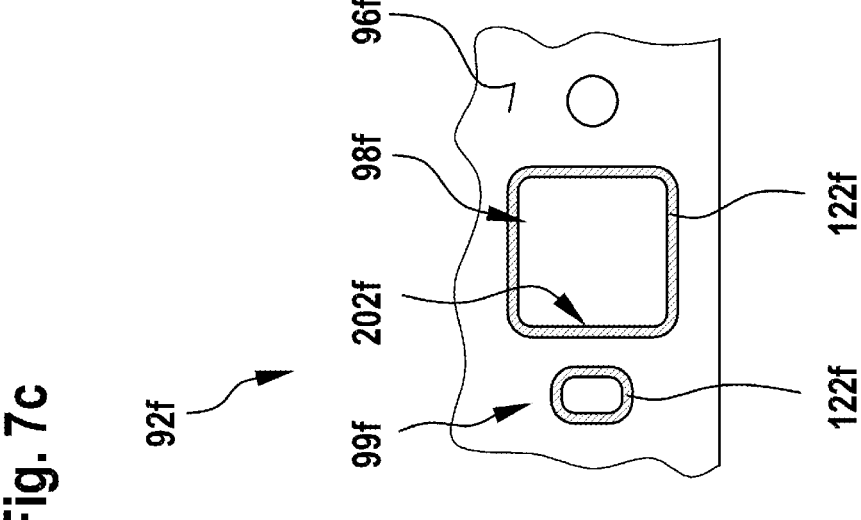

FIG. 7*c* shows the printed circuit board 92*f* in the region of the connection point 120*f*, in a top view of the upper side 96*f*, which faces away from the cell connector 100*f*, and FIG. 7*d* shows the underside 94*f*, which faces toward the cell connector 100*f*.

The cut-outs 98*f*, 99*f* each have an edge metallization 122*f*, which are connected to each other via a contact surface 124 made of copper. The contact surface 124*f* is exemplarily realized so as to be continuous between the cut-outs 98*f*, 99*f*. The edge metallizations 122*f* and the contact surface 124*f* are assigned to the connection point 120*f*. The contact surface 124*f* is located on the underside 94*f* of the printed circuit board 92*f* and is electrically connected to the set of electronics 90*f* of the battery pack 18*f*.

The material bonding medium 126*f* propagates during the soldering process from the second cut-out 99*f* via the contact surface 124*f* to the first cut-out 98*f*, a meniscus 203*f* being formed at the edge metallization 122*f* of the first cut-out 98*f* (see FIG. 7*a*).

The formed meniscus 203*f* and the edge metallization 122*f* are assigned to a checking unit 202*f*, which is designed to optically check the material bond between the cell connector and the printed circuit board 92*s*. The formation of the meniscus 203*f* makes it possible to optically check whether the material bond is successful.

Figure 8B:
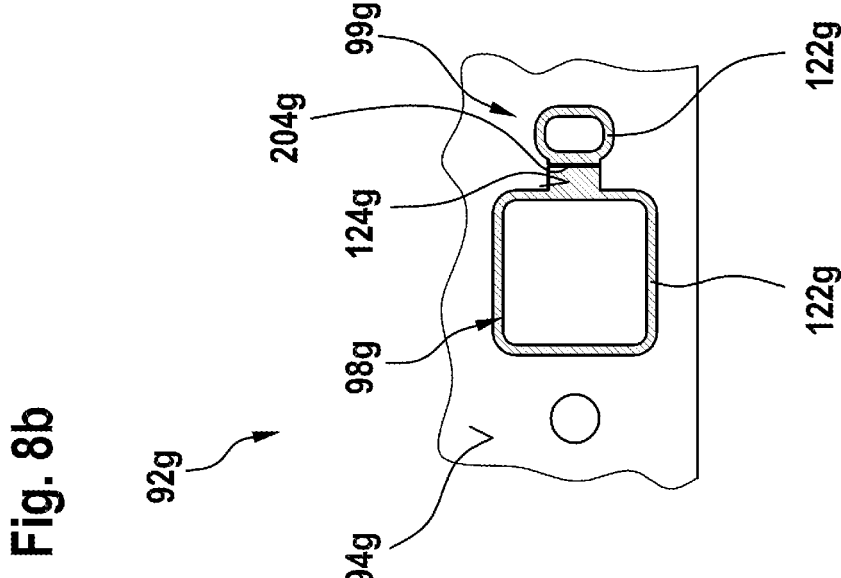
FIG. 8*b* shows a bottom view of the printed circuit board of the battery pack according to FIG. 8*a;*
Figure 8A:
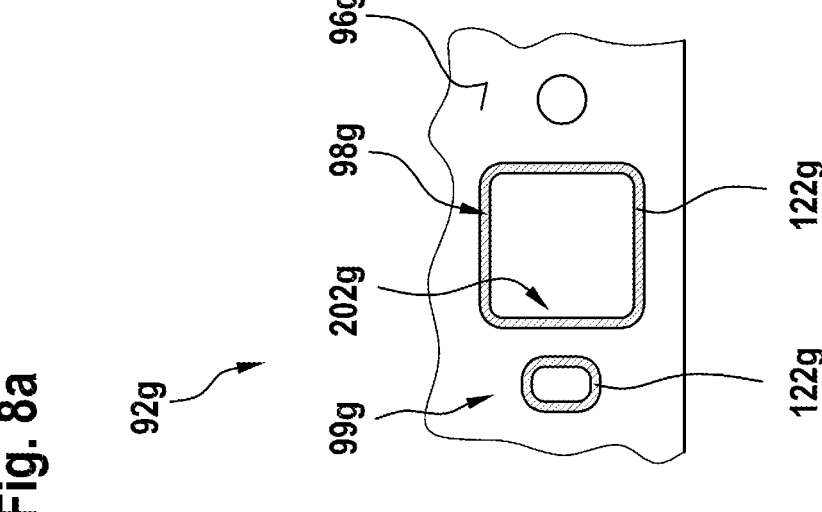
FIG. 8a shows a top view of a printed circuit board of a further embodiment of a battery pack.

FIG. 8*a* and FIG. 8*b* show an alternative embodiment of the previously described printed circuit board 92*f*, in a top view of the upper side 96*g* and of an underside 94*g*.

The cut-outs 98*g*, 99*g* each have an edge metallization 122*g*, which are connected, or connectable, to each other via a contact surface 124*g* made of copper. The contact surface 124*g* is exemplarily interrupted between the cut-outs 98*g*, 99*g*. The interruption 204*g* of the contact surface 124*g* divides it into two sub-regions that are not electrically connected to each other before the soldering process. The interruption 204*g* is realized, exemplarily, as a material cut-out. The soldering process electrically connects the two sub-regions to each other via the material bonding medium. Thus, before the soldering process, the edge metallizations 122g are thus not electrically connected to each other, and after a successful soldering process the edge metallizations 122g are electrically connected to each other.

Accordingly, the printed circuit board 92g has a checking unit 202g, which is designed to optically and electrically check the electrical connection between the printed circuit board 92g and the cell connector 100g. As before, the optical check is effected by means of a meniscus forming at the edge metallization 122g of the first cut-out 98f, and the electrical check is effected by means of an electrical measurement between the edge metallizations 122g, which is positive when bridging the interruption 204g. Accordingly, in this embodiment, the interruption 204g and both edge metallizations 122g are assigned to the checking unit 202g.

Figures 9A, 9B:
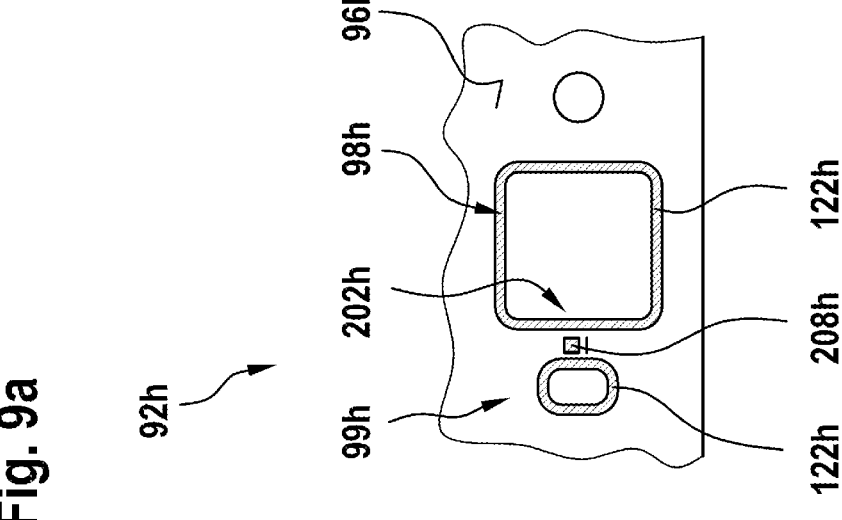
FIG. 9*a* shows a top view of a printed circuit board of a further embodiment of a battery pack.
FIG. 9*b* shows a bottom view of the printed circuit board of the battery pack according to FIG. 9*a;*

FIG. 9a and FIG. 9b show an alternative embodiment of the previously described printed circuit board 92g, in a top view of the upper side 96h and of an underside 94h.

The cut-outs 98h, 99h each have an edge metallization 122h, which are connected, or connectable, to each other via a contact surface 124h made of copper. The contact surface 124h is exemplarily interrupted between the cut-outs 98h, 99h. The contact surface 124h has two interruptions 204h. The interruptions 204h of the contact surface 124h divides it into three sub-regions that are not electrically connected to each other before the soldering process. The interruptions 204h are realized, exemplarily, as material cut-outs. In order to prevent the sub-regions from being electrically connected to each other as a result of lying on the printed circuit board 92h, located on the two outer sub-regions of the contact surface 124h there are solder pads, which are also electrically isolated from each other by the interruptions 204h. Solder is applied to the solder pads, the solder preventing accidental mechanical contact between the central sub-region and the cell connector. The solder pads thus act as spacers.

Figure 9C:
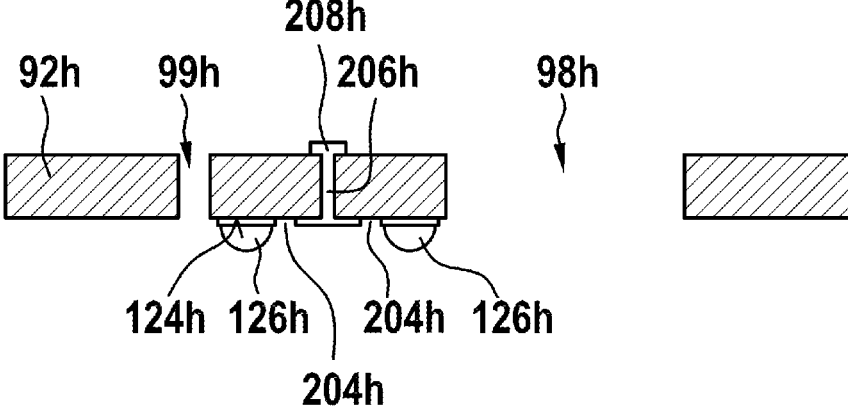

In addition, the middle sub-region on the underside 94h of the printed circuit board 92h has a through-plating 206h, which is arranged with a test point 208h on the upper side 96h of the printed circuit board 92h, see the schematic side view in FIG. 9c.

The soldering process electrically connects the two sub-regions to each other via the material bonding medium. Following the soldering process, the material bond can thus be checked by means of an optical check and additionally by means of an electrical check. The electrical check in this case is effected by measurement of a signal between the test point 208h on the printed circuit board 92h and the reference potential (GND).

Figure 10:
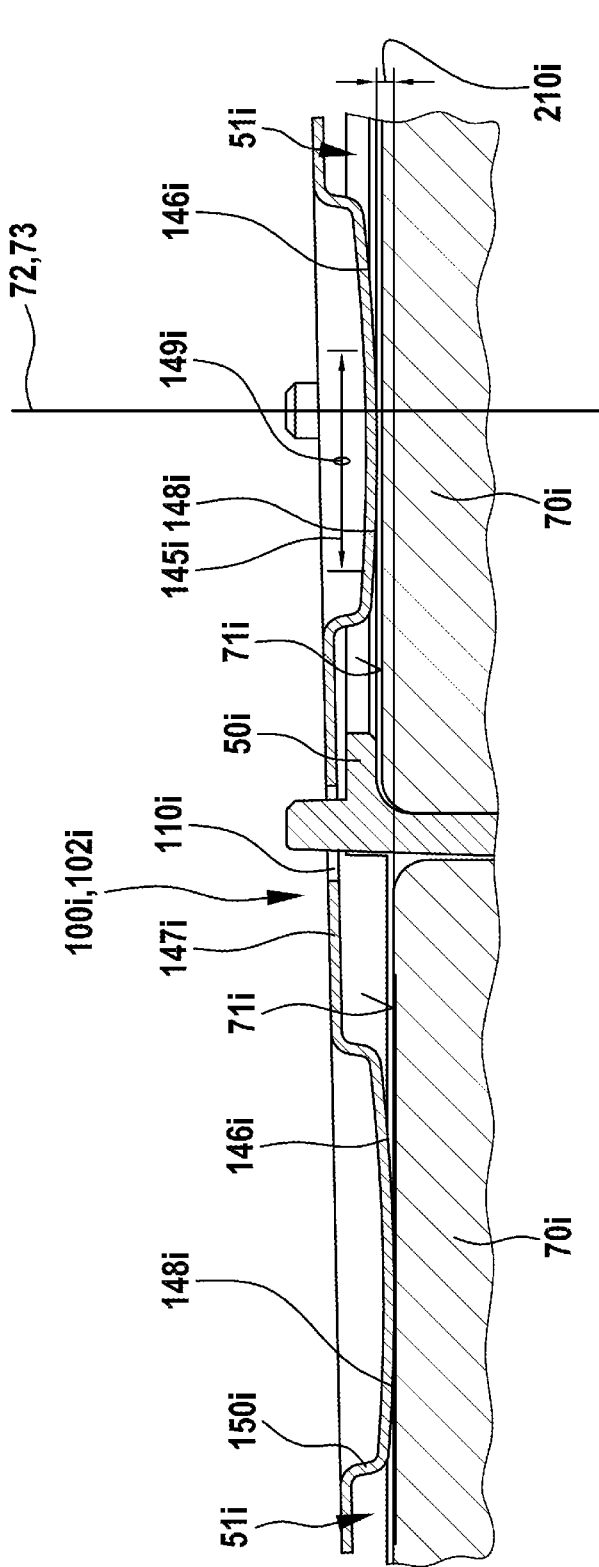
* and FIG. 10 shows a partial cross-section of a further embodiment of a battery pack in the region of a cell connecting element.

FIG. 10 shows a further alternative embodiment of a cell connector 100i in a cross-section, when connected to two battery cells 70i.

The associated battery pack 18i has a cell holder 50i. The cell holder 50i is designed to receive the battery cells 70i. In particular, the cell holder 50i has single cell receivers 51i, in each of which a single battery cell 70i is received.

The cell holder 50i is realized in such a manner that the battery cells 70i, in particular the cell terminals 71i of the battery cells 70i, are at the same height when mounted. Due to manufacturing tolerances in production of the battery cells 70i and the cell holder 50i, as well as the assembly tolerance in receiving the battery cells 70i in the cell holder 50i, an axial offset 210i of the battery cells 70i can occur along the longitudinal extent 72i of the battery cells 70i, as can be seen in FIG. 10.

The cell connector 100i has a cell connecting element 102i, which is provided to electrically connect the two battery cells 70i. The cell connector 100i is connected to a printed circuit board, not represented, by means of a printed-circuit-board connecting element, not represented. The cell connector 100i is designed to monitor a single cell voltage, but it is alternatively conceivable for the cell connector to be provided for power transmission.

The cell connecting element 102i is realized as a single piece. The cell connecting element 102i is provided for a material bond by means of a laser welding process.

The material bond between the cell connector 100i and the battery cells 70i, in particular the cell terminals 71i of the battery cells 70i, is effected in this case via a respective connection surface 146i of the cell connector 100i, which bears partially against the cell terminal 71i of the battery cell 70i. The two connection surfaces 146i in this case are connected to each other via a bridge 147i, the bridge 147i exemplarily having a positioning element 110i. A contact region 148i of the cell connector 100i, in which the cell connector bears against the cell terminal 71i, thus corresponds to a partial surface of the connection surface 146i.

In the region of the connection surfaces 146i the cell connecting element 102i is exemplarily realized in the shape of a pot, the connection surface 146i forming a bottom of the pot, which is enclosed by a cylindrical wall 150i.

The connection surfaces 146i are of a convex design in order to compensate for the axial offset 210i of the battery cells 70i. In particular, the connection surfaces 146i are of such a convex design that a position of the contact region 148i is dependent on the axial offset 210i of the battery cells 70i. If the battery cells 70i do not have an axial offset 210i relative to each other and are thus at the same height, then the contact region 148i is located, exemplarily, centrally on the cell poles 71i.

The greater the axial offset 210i, the greater is the distance of a center 149i of the contact region 148i from a central axis 73i. Due to the convex design of the connection surface 146i, a size of the contact region 148i is substantially constant within a certain range, for example in the case of an axial offset 210i of up to 0.5 mm.

Exemplarily, a diameter of the connection surface 146i is approximately 50% of a diameter of the battery cell 70i, and a diameter 145i of the contact region 148i corresponds to approximately 30% of the diameter of the battery cell 70i.

Due to the convex shape of the connection surface 146i, in contrast to the usual flat connection surfaces used for laser welding, it can be ensured that there is always a sufficiently large contact region 148i for producing the welded connection, even in the case of a large axial offset.

The connection process can be further improved by applying pressure to the cell connector 100i in the direction of the cell terminals 71i during laser welding.

In addition, it is conceivable for the position of the contact region 148i to be determined by means of an optical system, for example on the basis of the deformation, and the position of the laser irradiation to be adjusted in dependence on the position of the contact region 148i.

What is claimed is:

1. A battery pack, comprising:
   a housing including a cell holder and a mounting element extending from the cell holder;
   at least one battery cell at least partially received in the cell holder;
   a printed circuit board mounted on the cell holder and defining a cut-out; and a cell connector configured to electrically connect the at least one battery cell to the printed circuit board, the cell connector including a cell connecting element electrically connected to the at least one battery cell and a printed-circuit-board connecting element electrically connected to the printed circuit board, wherein the mounting element and the printed-circuit-board connecting element are located in the cut-out.

2. The battery pack according to claim 1, wherein:

the at least one battery cell includes at least two battery cells, and the cell connector is configured to electrically connect the at least two battery cells to the printed circuit board.

3. The battery pack according to claim 1, wherein the printed-circuit-board connecting element is electrically connected to a single cell voltage.

4. The battery pack according to claim 1, wherein:

the cell connector is configured as a single piece, and the cell connector is made of pure copper, a copper alloy, or nickel.

5. The battery pack according to claim 1, wherein the printed-circuit-board connecting element is located between the printed circuit board and the mounting element.

6. The battery pack according to claim 1, wherein the printed circuit board defines a printed-circuit-board plane which is perpendicular to a cell-connector plane that is defined by the cell connecting element.

7. The battery pack according to claim 1, wherein:

the cut-out has an edge metallization, and the printed-circuit-board connecting element bears against the edge metallization.

8. The battery pack according to claim 1, wherein the mounting element is rigid.

9. The battery pack according to claim 1, wherein the cell connector is connected to the printed circuit board in a materially bonded manner.

10. The battery pack according to claim 1, wherein the mounting element includes a spring element configured to apply a force to the cell connector in a direction of the printed circuit board.

11. The battery pack according to claim 1, wherein the mounting element is integrally configured as a single piece with the cell holder.

12. The battery pack according to claim 1, wherein the printed-circuit-board connecting element of the cell connector is connected to the printed circuit board by way of a soldered joint.

13. The battery pack according to claim 1, wherein the printed-circuit-board connecting element encloses the mounting element on three adjoining sides of the mounting element.

14. The battery pack according to claim 10, wherein the spring element includes two spring arms located in the cut-out.

15. The battery pack according to claim 14, wherein the two spring arms define a cavity of the mounting element.

16. A battery pack, comprising:

a housing including a cell holder and a mounting element extending from the cell holder;

at least one battery cell at least partially received in the cell holder;

a printed circuit board mounted on the cell holder and defining a cut-out; and a cell connector configured to electrically connect the at least one battery cell to the printed circuit board, the cell connector including a cell connecting element electrically connected to the at least one battery cell and a printed-circuit-board connecting element electrically connected to the printed circuit board, wherein the mounting element and the printed-circuit-board connecting element are located in the cut-out, wherein the mounting element includes a spring element configured to apply a force to the cell connector in a direction of the printed circuit board, and wherein the mounting element is integrally configured as a single piece with the cell holder.

* * * * *